US012794556B2

(12) United States Patent
Niigaki et al.

(10) Patent No.: US 12,794,556 B2
(45) Date of Patent: Nov. 10, 2026

(54) MULTI-PULSE LIGHT SOURCE AND MULTI-PULSE LIGHT GENERATION METHOD

(71) Applicant: HAMAMATSU PHOTONICS K.K., Hamamatsu (JP)

(72) Inventors: Ryu Niigaki, Hamamatsu (JP); Koji Takahashi, Hamamatsu (JP); Kyohei Shigematsu, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 317 days.

(21) Appl. No.: 18/721,444

(22) PCT Filed: Jan. 11, 2023

(86) PCT No.: PCT/JP2023/000470
§ 371 (c)(1),
(2) Date: Jun. 18, 2024

(87) PCT Pub. No.: WO2023/149164
PCT Pub. Date: Aug. 10, 2023

(65) Prior Publication Data
US 2025/0068002 A1 Feb. 27, 2025

(30) Foreign Application Priority Data
Feb. 7, 2022 (JP) ................................ 2022-016894

(51) Int. Cl.
*H04B 10/2513* (2013.01)
*G02F 1/01* (2006.01)

(52) U.S. Cl.
CPC ..... *H04B 10/25137* (2013.01); *G02F 1/0136* (2013.01); *G02F 1/0115* (2013.01)

(58) Field of Classification Search
CPC .......... H04B 10/25073; H04B 10/2513; H04B 10/25137
See application file for complete search history.

(56) References Cited

U.S. PATENT DOCUMENTS 5,473,719 A * 12/1995 Stone .............. H04B 10/25133 385/27
6,879,426 B1 4/2005 Weiner
(Continued)

FOREIGN PATENT DOCUMENTS

JP H11-095051 A 4/1999
JP 2010-060717 A 3/2010
(Continued)

OTHER PUBLICATIONS

Jiang, Yunshan et al., "Time-stretch LiDAR as a spectrally scanned time of-flight ranging camera," Nature Photonics, Jan. 2020, vol. 14, pp. 14-18.
(Continued)

*Primary Examiner* — Nathan M Cors
(74) *Attorney, Agent, or Firm* — Faegre Drinker Biddle & Reath LLP

(57) ABSTRACT

In a multi-pulse light source, a dispersion compensation unit includes a spectroscopic element configured to spectrally separate a plurality of wavelength components, a separation optical element that guides a first optical pulse group including one or more wavelength components among a plurality of wavelength components, and a second optical pulse group including one or more wavelength components different from the one or more wavelength components included in the first optical pulse group among the plurality of wavelength components to optical paths different from each other, a first spatial light modulator on which the first optical pulse group is incident and which compensates dispersion for each wavelength component with respect to the first optical pulse
(Continued)

group, and a second spatial light modulator on which the second optical pulse group is incident and which compensates dispersion for each wavelength component with respect to the second optical pulse group.

11 Claims, 14 Drawing Sheets

(56) References Cited

U.S. PATENT DOCUMENTS

| | | | | |
|---|---|---|---|---|
| 2005/0190432 | A1* | 9/2005 | Futami | H04B 10/25137 359/299 |
| 2008/0260319 | A1* | 10/2008 | Taira | G02F 1/011 385/1 |
| 2011/0311233 | A1* | 12/2011 | Oulianov | H04B 10/25137 398/159 |
| 2017/0059408 | A1 | 3/2017 | Körner et al. | |
| 2019/0386749 | A1* | 12/2019 | Lezec | H04B 10/25137 |

FOREIGN PATENT DOCUMENTS

| | | |
|---|---|---|
| JP | 2012-002965 A | 1/2012 |
| JP | 2012-230336 A | 11/2012 |

OTHER PUBLICATIONS

Tsuda, H. et al., "Analog and Digital Optical Pulse Synthesizers Using Arrayed-Waveguide Gratings for High-Speed Optical Signal Processing," Journal of Lightwave Technology, Mar. 15, 2008, vol. 26, No. 6, pp. 670-677.

Shemirani, M.B. et al., "Compensation of Multimode Fiber Dispersion by Optimization of Launched Amplitude, Phase, and Polarization," Journal of Lightwave Technology, Jul. 15, 2010, vol. 28, No. 14, pp. 2084-2095.

International Preliminary Report on Patentability mailed Aug. 22, 2024 for PCT/JP2023/000470.

* cited by examiner (a)

(b)

(a)

(b)

MULTI-PULSE LIGHT SOURCE AND MULTI-PULSE LIGHT GENERATION METHOD

TECHNICAL FIELD

An aspect of the present disclosure relates to a multi-pulse light source and a multi-pulse light generation method.

BACKGROUND ART

An example of the multi-pulse light source is described in Non Patent Literature 1. Pulse light from a broadband light source is spectrally separated into a plurality of wavelength components by a waveguide diffraction grating. The plurality of spectrally separated wavelength components are transmitted through the inside of fibers different in a length, thereby different delays are applied to the respective wavelength components. Then, the plurality of wavelength components are combined by a multiplexer to generate multi-pulse light in which a plurality of pulse light beams different in a central wavelength are aligned with predetermined time intervals.

CITATION LIST

Non Patent Literature

Non Patent Literature 1: YunshanJiang et al., "Time-stretch LiDAR as a spectrally scanned time of-flightranging camera" NATURE PHOTONICS, VOL. 14, pp. 14 to 18, January 2020

SUMMARY OF INVENTION

Technical Problem

In the multi-pulse light source described in Non Patent Literature 1, when applying a delay to each of the plurality of wavelength components, a pulse width of the multi-pulse light after combination is widened due to wavelength dispersion. Specifically, a feature amount such as a peak intensity, a full width at half maximum, and a peak time interval of the multi-pulse light changes significantly. The degree of the change is different for each pulse.

Therefore, it is conceivable to compensate the dispersion of the multi-pulse light for each wavelength component. For example, a plurality of wavelength components are spectrally separated into respective wavelength components, and a modulation plane of a spatial light modulator is divided into a plurality of modulation regions along a spectral direction. Then, each corresponding wavelength component is caused to be incident on each of the plurality of modulation regions, and a modulation pattern for compensating dispersion for each wavelength component is displayed in each of the modulation regions. However, in a case of using a single spatial light modulator in which the plurality of modulation regions respectively corresponding to the plurality of wavelength components are aligned only in the spectral direction of incident light, there is a limit to an effect of dispersion compensation due to restrictions on wavelength resolution.

An object of an aspect of the present disclosure is to provide a multi-pulse light source and a multi-pulse light generation method which are capable of effectively compensating dispersion of multi-pulse light in which a central wavelength is different for each pulse.

Solution to Problem

A multi-pulse light source according to an aspect of the present disclosure includes: a pulse light source configured to generate pulse light capable of being separated into a plurality of wavelength components different in a central wavelength; a delay application unit configured to apply a different delay for each wavelength component with respect to the plurality of wavelength components; and a dispersion compensation unit configured to compensate dispersion for each wavelength component with respect to the plurality of wavelength components. The dispersion compensation unit includes: a spectroscopic element configured to spectrally separate the plurality of wavelength components into respective wavelength components; a separation optical element provided upstream or downstream of the spectroscopic element and configured to guide a first wavelength component group including one or more wavelength components among the plurality of wavelength components, and a second wavelength component group including one or more wavelength components different from the one or more wavelength components included in the first wavelength component group among the plurality of wavelength components to optical paths different from each other; a first spatial light modulator including a first modulation region on which the first wavelength component group is incident, the first modulation region being configured to modulate for compensating dispersion for each wavelength component with respect to the first wavelength component group; and a second spatial light modulator including a second modulation region on which the second wavelength component group is incident, the second modulation region being configured to modulate for compensating dispersion for each wavelength component with respect to the second wavelength component group.

In the above-described multi-pulse light source, the pulse light output from the pulse light source is input to the delay application unit, and a different delay for each wavelength component is applied. As a result, multi-pulse light including a plurality of pulses different in a central wavelength is generated. In addition, the multi-pulse light source includes the dispersion compensation unit that compensates dispersion for each wavelength component. In the dispersion compensation unit, the first wavelength component group is incident on the first spatial light modulator, and the second wavelength component group is incident on the second spatial light modulator. In addition, dispersion for each wavelength component is compensated with respect to each of the wavelength component groups. According to this, wavelength resolution with respect to each wavelength component is further improved and the maximum amount of dispersion compensation can be significantly improved as compared with a case of using a single spatial light modulator. As a result, dispersion of multi-pulse light in which a central wavelength is different for each pulse can be more effectively compensated for each pulse.

A multi-pulse light source according to another aspect of the present disclosure includes: a pulse light source configured to generate pulse light capable of being separated into a plurality of wavelength components different in a central wavelength; a delay application unit configured to apply a different delay for each wavelength component with respect to the plurality of wavelength components; and a dispersion compensation unit configured to compensate dispersion for each wavelength component with respect to the plurality of wavelength components. The dispersion compensation unit includes: a spectroscopic element configured to spectrally separate the plurality of wavelength components into respective wavelength components; a separation optical element provided upstream or downstream of the spectroscopic element and configured to guide a first wavelength component group including one or more wavelength components among the plurality of wavelength components, and a second wavelength component group including one or more wavelength components different from the one or more wavelength components included in the first wavelength component group among the plurality of wavelength components to optical paths different from each other; and a spatial light modulator including a first modulation region on which the first wavelength component group is incident and configured to modulate for compensating dispersion for each wavelength component with respect to the first wavelength component group, and a second modulation region on which the second wavelength component group is incident and configured to modulate for compensating dispersion for each wavelength component with respect to the second wavelength component group. The first modulation region and the second modulation region are aligned along a direction intersecting spectral directions of the first wavelength component group and the second wavelength component group when being incident on the first modulation region and the second modulation region, respectively.

In the above-described multi-pulse light source, the pulse light output from the pulse light source is input to the delay application unit, and a different delay is applied for each wavelength component. As a result, multi-pulse light including a plurality of pulses different in a central wavelength is generated. In addition, the multi-pulse light source includes the dispersion compensation unit configured to compensate dispersion for each wavelength component. In the spatial light modulator of the dispersion compensation unit, the first modulation region and the second modulation region are aligned along a direction intersecting spectral directions of the first wavelength component group and the second wavelength component group when being incident on the first modulation region and the second modulation region, respectively. According to this, wavelength resolution with respect to each wavelength component is improved and the maximum amount of dispersion compensation is significantly improved as compared with a case where a plurality of modulation regions respectively corresponding to a plurality of wavelength components are aligned only in a spectral direction of incident light. As a result, dispersion of multi-pulse light in which a central wavelength is different for each pulse can be more effectively compensated for each pulse.

In the above-described multi-pulse light source, the spectroscopic element may include a diffraction grating. In this case, by using the diffraction grating, the plurality of wavelength components can be incident on the spatial light modulator after being appropriately spectrally separated. In addition, the spectroscopic element can be simply configured.

In the above-described multi-pulse light source, the separation optical element may include a dichroic mirror. In this case, by using the dichroic mirror, the plurality of wavelength components can be reflected or transmitted in correspondence with a wavelength region, and the first wavelength component group and the second wavelength component group can be appropriately separated. In addition, the separation optical element can be simply configured.

The above-described multi-pulse light source may further include: a polarization control unit configured to make a polarization direction of the one or more wavelength components included in the first wavelength component group before being incident on the separation optical element, and a polarization direction of the one or more wavelength components included in the second wavelength component group before being incident on the separation optical element be orthogonal to each other; and a wavelength plate provided on an optical path between the separation optical element and the first modulation region and configured to rotate the polarization direction of the first wavelength component group by 90°. The separation optical element may include a polarization beam splitter or a birefringent crystal. In this case, after performing control of a polarization direction by the polarization control unit, it is possible to guide the first wavelength component group and the second wavelength component group to optical paths different from each other in correspondence with the polarization direction by using a polarization beam splitter or a birefringent crystal. Furthermore, by causing the first wavelength component group to be transmitted through the wavelength plate, the first wavelength component group and the second wavelength component group can incident on the spatial light modulator after the polarization direction of the first wavelength component group is made to match the polarization direction of the second wavelength component group.

In the above-described multi-pulse light source, the delay application unit may also serve as the polarization control unit. In this case, the number of necessary constituent elements is reduced, and thus the multi-pulse light source can be simplified.

In the above-described multi-pulse light source, the delay application unit may include a plurality of polarization maintaining fibers which propagate the plurality of wavelength components respectively, lengths of the plurality of polarization maintaining fibers may be different from each other, and a polarization plane of the polarization maintaining fibers which propagate the wavelength components included in the first wavelength component group may be rotated by 90° with respect to a polarization plane of the polarization maintaining fibers which propagate the wavelength components included in the second wavelength component group between a light input end and a light output end of the plurality of polarization maintaining fibers. In this case, it is possible to appropriately adjust the polarization direction of the one or more wavelength components included in the first wavelength component group and the polarization direction of the one or more wavelength components included in the second wavelength component group while applying a delay in correspondence with the length of the polarization maintaining fibers.

In the above-described multi-pulse light source, the delay application unit may include a plurality of optical fibers which propagate the plurality of wavelength components respectively and which have lengths different from each other. In this case, since a delay can be applied in correspondence with the length of the optical fibers, the delay application unit can be simply configured.

In the above-described multi-pulse light source, the dispersion compensation unit may be placed downstream of the delay application unit. In this case, in order to directly perform dispersion compensation with respect to the plurality of wavelength components (pulses) in which wavelength dispersions different from each other occur due to application of delays different from each other, an effect of the dispersion compensation with respect to individual wavelength components (pulses) can be efficiently confirmed.

A multi-pulse light generation method according to still another aspect of the present disclosure includes: a pulse light generation step of generating pulse light capable of being separated into a plurality of wavelength components different in a central wavelength; a delay application step of applying a different delay for each wavelength component with respect to the plurality of wavelength components; and a dispersion compensation step of compensating dispersion for each wavelength component with respect to the plurality of wavelength components before or after the delay application step. The dispersion compensation step includes a spectroscopic step of spectrally separating the plurality of wavelength components into respective wavelength components, a separation step of guiding a first wavelength component group including one or more wavelength components among the plurality of wavelength components, and a second wavelength component group including one or more wavelength components different from the one or more wavelength components included in the first wavelength component group among the plurality of wavelength components to optical paths different from each other before or after the spectroscopic step, and a modulation step of performing modulation for compensating dispersion for each wavelength component with respect to the first wavelength component group in a first spatial light modulator including a first modulation region on which the first wavelength component group is incident, and of performing modulation for compensating dispersion for each wavelength component with respect to the second wavelength component group in a second spatial light modulator including a second modulation region on which the second wavelength component group is incident.

In the multi-pulse light generation method according to an aspect of the present disclosure, a different delay for each wavelength component is applied in the delay application step with respect to the pulse light generated in the pulse light generation step. According to this, multi-pulse light including a plurality of pulses different in a central wavelength is generated. In addition, the multi-pulse light generation method includes the dispersion compensation step of compensating dispersion for each wavelength component. In the dispersion compensation step, the first wavelength component group is incident on the first spatial light modulator, and the second wavelength component group is incident on the second spatial light modulator. Then, dispersion for each wavelength component is compensated with respect to the respective wavelength component groups. According to this, wavelength resolution with respect to each wavelength component is improved and the maximum amount of dispersion compensation can be significantly improved as compared with a case of using a single spatial light modulator. As a result, dispersion of multi-pulse light in which a central wavelength is different for each pulse can be more effectively compensated for each pulse.

A multi-pulse light generation method according to still another aspect of the present disclosure includes: a pulse light generation step of generating pulse light capable of being separated into a plurality of wavelength components different in a central wavelength; a delay application step of applying a different delay for each wavelength component with respect to the plurality of wavelength components; and a dispersion compensation step of compensating dispersion for each wavelength component with respect to the plurality of wavelength components before or after the delay application step. The dispersion compensation step includes a spectroscopic step of spectrally separating the plurality of wavelength components into respective wavelength components, a separation step of guiding a first wavelength component group including one or more wavelength components among the plurality of wavelength components, and a second wavelength component group including one or more wavelength components different from the one or more wavelength components included in the first wavelength component group among the plurality of wavelength components to optical paths different from each other before or after the spectroscopic step, and a modulation step of performing modulation for compensating dispersion for each wavelength component with respect to the first wavelength component group and the second wavelength component group in a spatial light modulator that includes a first modulation region on which the first wavelength component group is incident and a second modulation region on which the second wavelength component group is incident, and in which the first modulation region and the second modulation region are aligned along a direction intersecting spectral directions of the first wavelength component group and the second wavelength component group when being incident on the first modulation region and the second modulation region.

In the multi-pulse light generation method according to an aspect of the present disclosure, a different delay for each wavelength component is applied in the delay application step with respect to the pulse light generated in the pulse light generation step. According to this, multi-pulse light including a plurality of pulses different in a central wavelength is generated. In addition, the multi-pulse light generation method includes the dispersion compensation step of compensating dispersion for each wavelength component. In the dispersion compensation step, the first modulation region and the second modulation region are aligned along a direction intersecting spectral directions of the first wavelength component group and the second wavelength component group when being incident on the first modulation region and the second modulation region. According to this, wavelength resolution with respect to each wavelength component is improved and the maximum amount of dispersion compensation can be significantly improved as compared with a case where a plurality of modulation regions respectively corresponding to a plurality of wavelength components are aligned only in a spectral direction of incident light. As a result, dispersion of multi-pulse light in which a central wavelength is different for each pulse can be more effectively compensated for each pulse.

Advantageous Effects of Invention

According to the aspects of the present disclosure, it is possible to provide a multi-pulse light source and a multi-pulse light generation method which are capable of effectively compensating dispersion of multi-pulse light for each pulse in which a central wavelength is different for each pulse.

DESCRIPTION OF EMBODIMENTS

Figure 1:
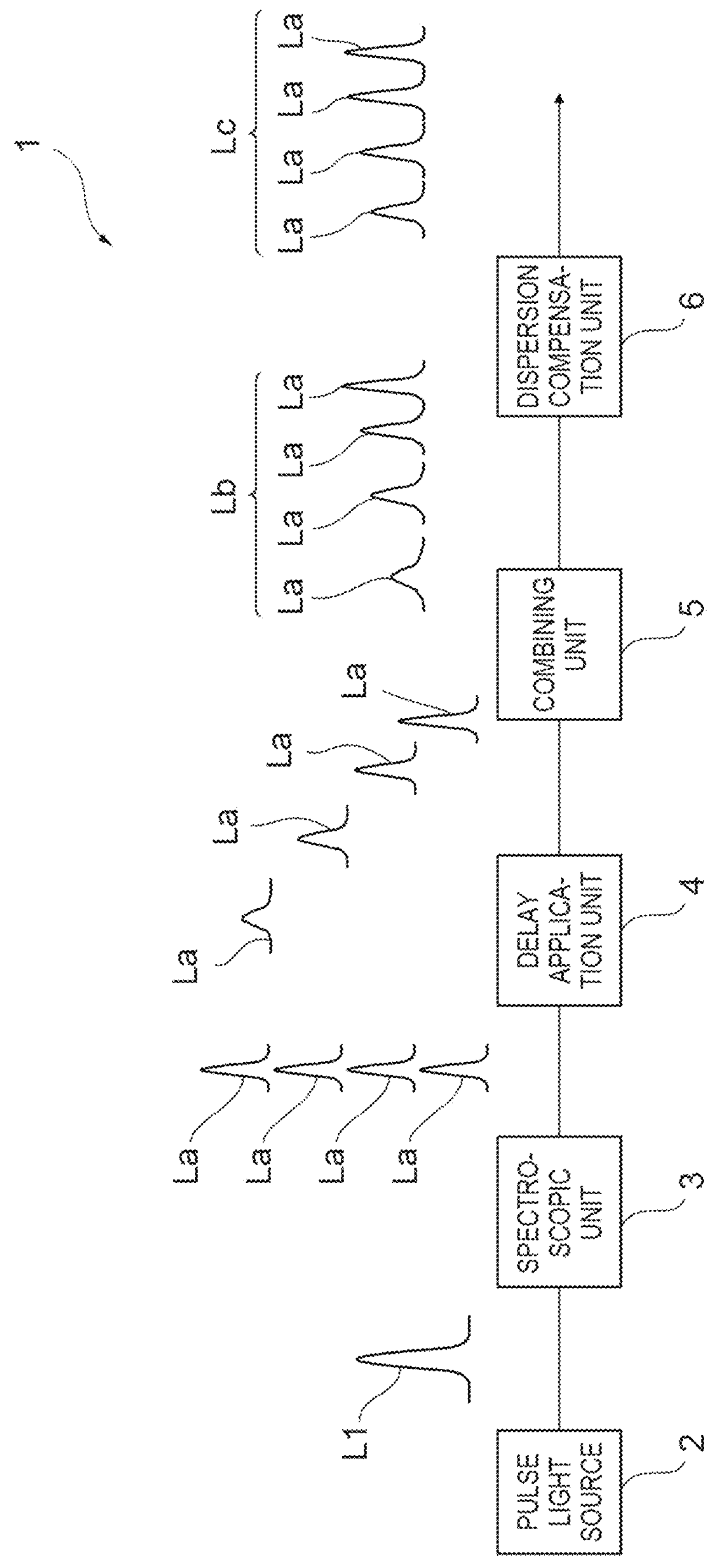
FIG. 1 is a view schematically illustrating a configuration of a multi-pulse light source according to a first embodiment of an aspect of the present disclosure.

Hereinafter, preferred embodiments of the present disclosure will be described in detail with reference to the drawings. Note that, in each of the drawings, the same reference numeral will be given to the same or equivalent portion, and redundant description will be omitted.

First Embodiment

FIG. 1 is a view schematically illustrating a configuration of a multi-pulse light source 1 according to a first embodiment. As illustrated in FIG. 1, the multi-pulse light source 1 according to this embodiment includes a pulse light source 2, a spectroscopic unit 3, a delay application unit 4, a combining unit 5, and a dispersion compensation unit 6. The spectroscopic unit 3 is optically coupled to the pulse light source 2. The delay application unit 4 is optically coupled to the spectroscopic unit 3. The combining unit 5 is optically coupled to the delay application unit 4. The dispersion compensation unit 6 is optically coupled to the combining unit 5. The pulse light source 2 is a light source that emits single pulse light L1. The pulse light source 2 is, for example, a laser light source, and emits near-infrared ultrashort pulse light in a femtosecond region or a picosecond region. Specifically, the pulse light source 2 is constituted by, for example, a titanium sapphire laser, a Yb:YAG laser, a Yb fiber laser, an Er fiber laser, or a Tm fiber laser. The pulse light L1 is light that can be separated into a plurality of wavelength components different in a central wavelength, and has a certain degree of spread in a wavelength region. In other words, the pulse light L1 includes a plurality of wavelength components different in a central wavelength.

Figure 2:
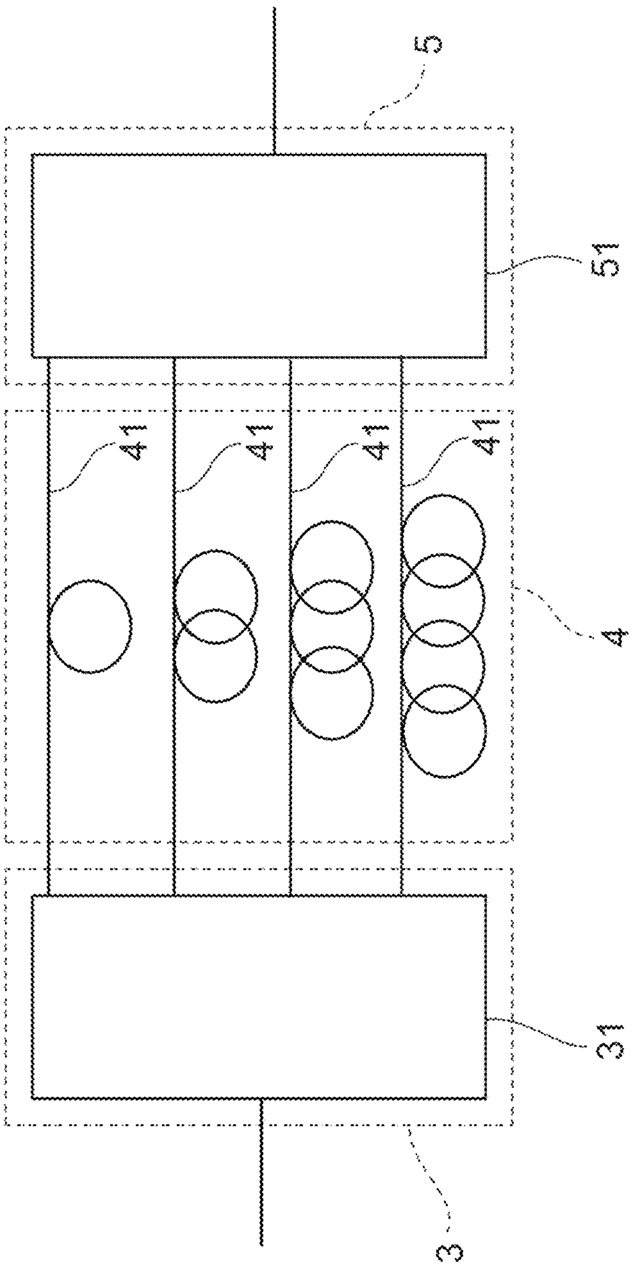
FIG. 2 is a view illustrating an example of a spectroscopic unit, a delay application unit, and a combining unit according to the first embodiment.

The spectroscopic unit 3 is a section configured to spectrally separate the pulse light L1 into a plurality of wavelength components. FIG. 2 is a view illustrating an example of the spectroscopic unit 3, the delay application unit 4, and the combining unit 5. As illustrated in FIG. 2, the spectroscopic unit 3 includes, for example, an array waveguide diffraction grating 31. The spectroscopic unit 3 may consist only of the array waveguide diffraction grating 31. The array waveguide diffraction grating 31 is a spectroscopic element. The array waveguide diffraction grating 31 spatially separates a plurality of wavelength components included in the pulse light L1 for each wavelength. The array waveguide diffraction grating 31 converts each of the plurality of wavelength components into an independent optical pulse La (refer to FIG. 1), and the optical pulse La is incident on the delay application unit 4 located thereafter. That is, the array waveguide diffraction grating 31 generates a plurality of optical pulses La different in a central wavelength.

The delay application unit 4 is a section configured to apply a delay different for each wavelength component (for each optical pulse La) to the plurality of wavelength components (optical pulses La) spectrally separated by the spectroscopic unit 3. As illustrated in FIG. 2, the delay application unit 4 includes, for example, a plurality of optical fibers 41. The delay application unit 4 may consist only of the plurality of optical fibers 41. The number of the optical fibers 41 is the same as the number of wavelength components spectrally separated by the spectroscopic unit 3. The plurality of optical fibers 41 are, for example, single mode fibers or photonic crystal fibers. The lengths of the plurality of optical fibers 41 are different from each other. The optical pulses La are delayed by an amount different depending on a difference in the length of the plurality of optical fibers 41. A time waveform of each of the optical pulse La varies in correspondence with dispersion of the optical fiber 41 while propagating through the plurality of optical fibers 41. Since the lengths of the plurality of optical fibers 41 are different from each other, dispersions of the plurality of optical pulses La after respectively propagating through the plurality of optical fibers 41 are different from each other. Accordingly, the variation in the time waveform of the pulse which occurs while each of the optical pulses La propagates through each of the plurality of optical fibers 41 is also different for each optical pulse La.

Each of the optical pulses La passing through each of the plurality of optical fibers 41 is incident on the combining unit 5. For example, the combining unit 5 includes an array waveguide diffraction grating 51 different from the array waveguide diffraction grating 31. The combining unit 5 may consist only of the array waveguide diffraction grating 51. The array waveguide diffraction grating 51 combines the plurality of optical pulses La passing through the plurality of optical fibers 41 on one optical path. That is, the array waveguide diffraction grating 51 generates multi-pulse light Lb (refer to FIG. 1) including the plurality of optical pulses La which are different in a central wavelength and have time intervals.

Description will be made with reference to FIG. 1 again. The dispersion compensation unit 6 is a section configured to compensate a wavelength dispersion occurred in the plurality of optical pulses La between the pulse light source 2 and the dispersion compensation unit 6 (mainly, in the delay application unit 4). Specifically, the dispersion compensation unit 6 individually compensates the wavelength dispersion of each of the optical pulses La to suppress a variation in the time waveform of the optical pulse La. The dispersion compensation unit 6 generates multi-pulse light Lc that is multi-pulse light after performing dispersion compensation of the multi-pulse light Lb.

Figure 3:
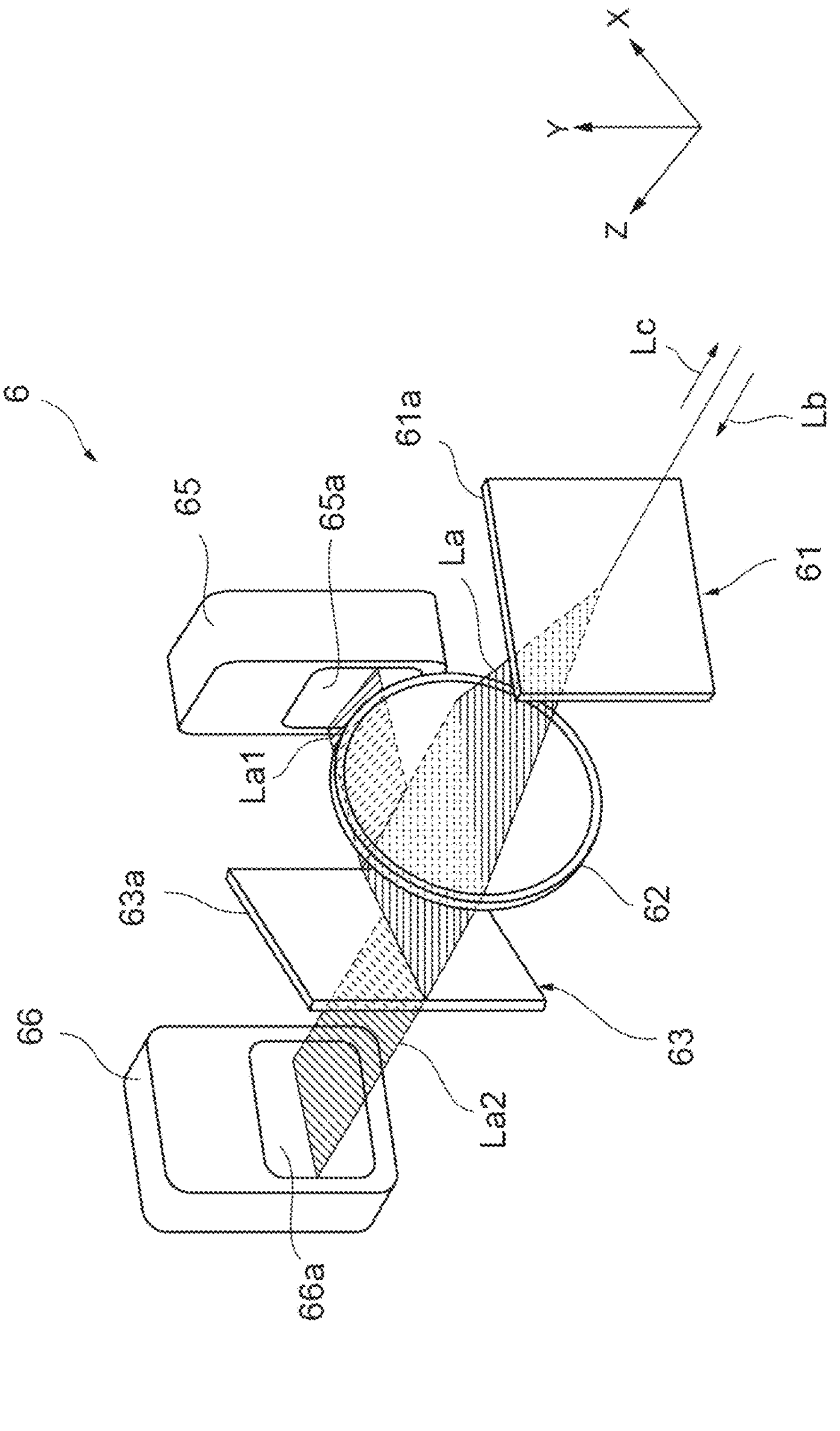
FIG. 3 is a view illustrating a configuration of a dispersion compensation unit according to the first embodiment.

FIG. 3 illustrates a configuration diagram of the dispersion compensation unit 6 according to the first embodiment. The dispersion compensation unit 6 includes a spectroscopic element 61, a lens 62, a separation optical element 63, a first spatial light modulator 65, and a second spatial light modulator 66. In the first embodiment, the spectroscopic element 61 includes a diffraction grating 61*a*. As an example, the spectroscopic element 61 may consist only of the diffraction grating 61*a*. The separation optical element 63 includes a dichroic mirror 63*a*. As an example, the separation optical element 63 may consist only of the dichroic mirror 63*a*. Here, a direction in which the multi-pulse light Lb is incident is set as a Z-axis, a horizontal direction in a plane orthogonal to the Z-axis is set as an X-axis direction, and a vertical direction in the plane is set as a Y-axis direction. In the dispersion compensation unit 6, the multi-pulse light Lb is incident on the diffraction grating 61*a* along the Z-axis direction. The diffraction grating 61*a* spatially and spectrally separates each of the optical pulses La included in the multi-pulse light Lb. A spectral direction matches the X-direction. The spectroscopic element 61 may include another optical component such as a prism in combination with the diffraction grating 61*a* instead of the diffraction grating 61*a*. Each of the optical pulses La is collimated in an XZ plane by the lens 62, and reaches the dichroic mirror 63*a* as parallel light. The lens 62 may be a convex lens formed from a light-transmitting member, a concave mirror having a concave light-reflecting surface, or a cylindrical lens.

The separation optical element 63 is placed downstream of the spectroscopic element 61 through the lens 62. The dichroic mirror 63*a* reflects a first optical pulse group (first wavelength component group) La1 including one or more optical pulses La among the plurality of optical pulses La, and allows a second optical pulse group (second wavelength component group) La2 including one or more optical pulses La different from the optical pulses La included in the first optical pulse group La1 to be transmitted therethrough. According to this, the dichroic mirror 63*a* guides the first optical pulse group La1 and the second optical pulse group La2 to optical paths different from each other. Specifically, the dichroic mirror 63*a* guides the first optical pulse group La1 to an optical path along the X-axis direction. At this time, the spectral direction of the first optical pulse group La1 is converted from the X-axis direction into the Z-axis direction in accordance with the reflection. The dichroic mirror 63*a* guides the second optical pulse group La2 to an optical path along the Z-axis axis direction. At this time, the spectral direction of the second optical pulse group La2 remains in the X-axis direction. The first optical pulse group La1 is incident on the first spatial light modulator 65, and the second optical pulse group La2 is incident on the second spatial light modulator 66 which is separate from the first spatial light modulator 65. The first spatial light modulator 65 is disposed on the optical path of the first optical pulse group La1, and is optically coupled to the dichroic mirror 63*a* through the optical path. The second spatial light modulator 66 is disposed on the optical path of the second optical pulse group La2 and is optically coupled to the dichroic mirror 63*a* through the optical path. In a case where the number of the optical pulses La is four, and central wavelengths thereof are λ1, λ2, λ3, and λ4, respectively, the optical pulse La with the wavelength λ1 and the optical pulse La with the wavelength λ2 may be included in the first optical pulse group La1, and the optical pulse La with the wavelength λ3 and the optical pulse La with the wavelength λ4 may be included in the second optical pulse group La2. However, the first optical pulse groups La1 and the second optical pulse group La2 may include one or more optical pulses La, and the number of the optical pulses La constituting each wavelength component group is not limited thereto. In description of this embodiment, the magnitude relationship of the wavelengths λ1, λ2, λ3 and λ4 is described as λ1<λ2<λ3<λ4, but the magnitude relationship of wavelengths λ1, λ2, λ3, and λ4 is not limited thereto and is any relationship.

The first spatial light modulator 65 and the second spatial light modulator 66 are optically coupled to the dichroic mirror 63*a*. The first spatial light modulator 65 modulates the phase of the optical pulses La included in the first optical pulse group La1 for each wavelength included in the optical pulses La. The first spatial light modulator 65 is, for example, a liquid crystal on silicon (LCOS) type that only performs phase modulation. The first spatial light modulator 65 may only perform intensity modulation or may perform both the phase modulation and the intensity modulation in combination. Although FIG. 3 illustrates the first spatial light modulator 65 that is a reflection type, the first spatial light modulator 65 may be a transmission type. The second spatial light modulator 66 modulates the phase of the optical pulses La included in the second optical pulse group La2 for each wavelength included in the optical pulses La. The other configurations of the second spatial light modulator 66 are the same as those of the first spatial light modulator 65.

Figure 4:
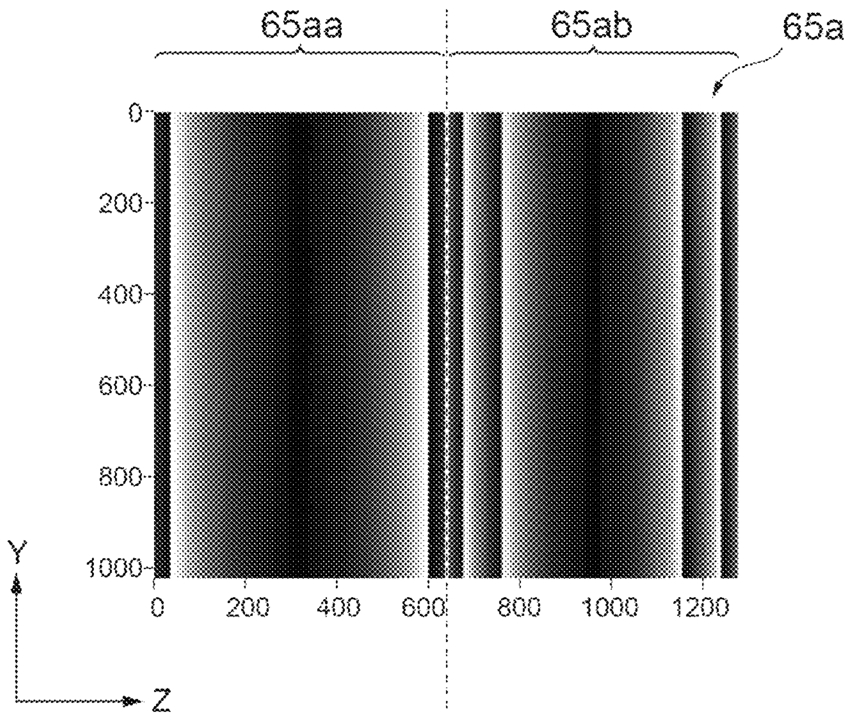
FIGS. 4 (*a*) and (*b*) of FIG. 4 are views illustrating a modulation plane of a spatial light modulator according to the first embodiment.
Figure 4:
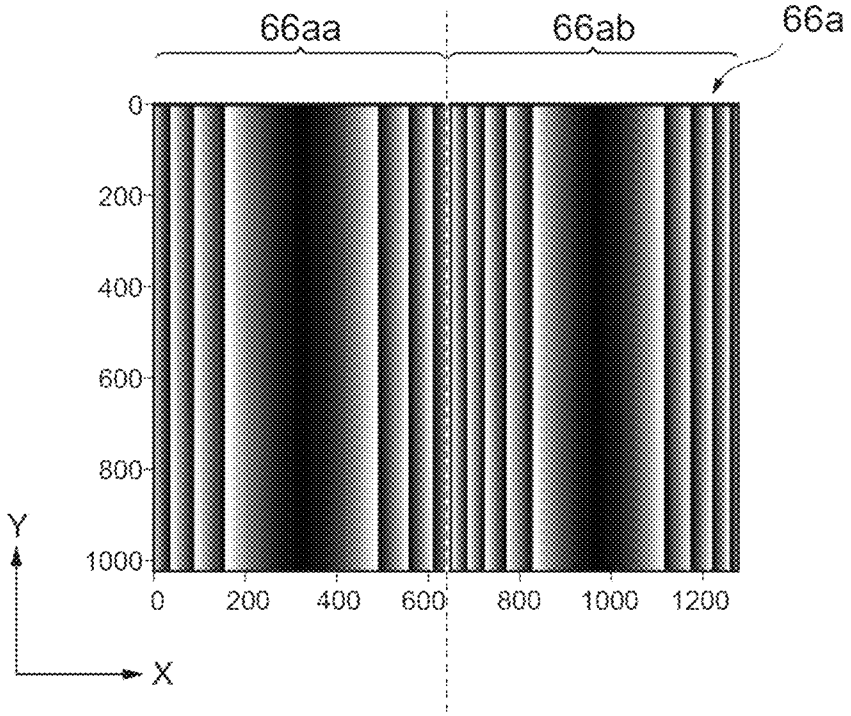

As illustrated in FIG. 3, the first spatial light modulator 65 includes a modulation plane 65*a* (first modulation region) defined in a YZ plane. In the modulation plane 65*a*, a plurality of pixels are arranged in a two-dimensional shape. In the modulation plane 65*a*, the same number of modulation regions as that of the optical pulses La included in the first optical pulse group La1 are aligned in the Z-axis direction, and extend in the Y-axis direction. FIG. 4 (*a*) is a view illustrating an example of the modulation plane 65*a*. An example shown in FIG. 4 (*a*) illustrates a case where two optical pulses La are included in the first optical pulse group La1. In this case, in the modulation plane 65*a*, two modulation regions 65*aa* and 65*ab* are aligned in the Z-axis direction and extend in the Y-axis direction. Among the optical pulses La included in the first optical pulse group La1, a corresponding optical pulse La is incident on each of the modulation region 65*aa* and the modulation region 65*ab*.

In FIG. 4(*a*), a phase distribution on the modulation plane 65*a* is shown by color shading. In the same drawing, as the color is darker, a phase value is closer to 2π (rad), and as the color is lighter, the phase value is closer to 0 (rad). In FIG. 4(*a*), numbers aligned in the Z-axis direction are pixel numbers in the Z-axis direction, and numbers aligned in the Y-axis direction are pixel numbers in the Y-axis direction. A phase modulation pattern is displayed in each of the modulation region 65*aa* and the modulation region 65*ab*. The phase modulation pattern varies along the Z-axis direction and is constant in the Y-axis direction. In the phase modulation pattern, as the amount of phase modulation is greater, a larger dispersion can be compensated. In the example shown in FIG. 4(*a*), the amount of phase modulation of the phase modulation pattern displayed in the modulation region 65*ab* is larger as compared with the modulation region 65*aa*. Accordingly, the amount of dispersion compensation for the optical pulse La incident on the modulation region 65*ab* becomes larger than the amount of dispersion compensation for the optical pulse La incident on the modulation region 65*aa*.

As illustrated in FIG. 3, the second spatial light modulator 66 includes a modulation plane 66*a* (second modulation region) as in the first spatial light modulator 65. A plurality of pixels are two-dimensionally arranged in the modulation plane 66*a*. In the modulation plane 66*a*, the same number of modulation regions as that of the optical pulses La included in the second optical pulse group La2 are aligned in the X-axis direction, and extend in the Y-axis direction. FIG. 4(*b*) is a view illustrating an example of the modulation plane 66*a*. An example shown in FIG. 4(*b*) illustrates a case where two optical pulses La are included in the second optical pulse group La2. In this case, in the modulation plane 66*a*, two modulation regions 66*aa* and 66*ab* are aligned in the X-axis direction. Among the optical pulses La included in the second optical pulse group La2, a corresponding optical pulse La is incident on each of the modulation region 66*aa* and the modulation region 66*ab*.

In FIG. 4(*b*), a phase distribution on the modulation plane 66*a* is shown by color shading. In the same drawing, as the color is darker, a phase value is closer to 2π (rad), and as the color is lighter, the phase value is closer to 0 (rad). A phase modulation pattern is displayed in each of the modulation region 66*aa* and the modulation region 66*ab*. The phase modulation pattern varies along the X-axis direction and is constant in the Y-axis direction. In the example shown in FIG. 4(*b*), the amount of phase modulation of the phase modulation pattern displayed in the modulation region 66*ab* is larger as compared with the modulation region 66*aa*. In addition, when being compared with FIG. 4(*a*), the amount of phase modulation of the phase modulation pattern is largest in the modulation region 66*ab*, next largest in the modulation region 66*aa*, next largest in the modulation region 65*ab*, and smallest in the modulation region 65*aa*. That is, the amount of dispersion compensation is largest in the modulation region 66*ab*, next largest in the modulation region 66*aa*, next largest in the modulation region 65*ab*, and smallest in the modulation region 65*aa*. In the delay application unit 4, in a case of using a plurality of optical fibers 41 different in a length, as the length of the optical fibers 41 is longer, the wavelength dispersion of the optical pulses La passing through the optical fibers 41 becomes larger. Therefore, an optical pulse La passing through the longest optical fiber 41 is incident on the modulation region 66*ab*, an optical pulse La passing through a next long optical fiber 41 is incident on the modulation region 66*aa*, an optical pulse La passing through a next long optical fiber 41 is incident on the modulation region 65*ab*, and an optical pulse La passing through the shortest optical fiber 41 is incident on the modulation region 65*aa*. According to this, dispersion compensation can be performed in the magnitude corresponding to the wavelength dispersion of each of the optical pulses La.

Description will be made with reference to FIG. 3 again. The first optical pulse group La1 that is modulated by the first spatial light modulator 65 and is reflected, and the second optical pulse group La2 that is modulated by the second spatial light modulator 66 and is reflected are guided again on a common optical path by the dichroic mirror 63*a*. The plurality of optical pulses La are focused to one point on the diffraction grating 61*a* by the lens 62. The lens 62 at this time functions as a condensing optical system that condenses each of the optical pulses La. The diffraction grating 61*a* functions as a combining optical system, and combines a plurality of optical pulses La. That is, the optical pulses La are condensed and combined by the lens 62 and the diffraction grating 61*a*, and become multi-pulse light Lc after dispersion compensation.

The configuration of the dispersion compensation unit 6 is not limited to the configuration illustrated in FIG. 3. For example, the spectroscopic element 61 (diffraction grating 61*a*) may be placed downstream of the separation optical element 63 (dichroic mirror 63*a*). In this case, the respective optical pulses La included in the multi-pulse light Lb are guided in a state of being separated into the first optical pulse group La1 and the second optical pulse group La2 by the dichroic mirror 63*a*, and the optical pulses La included in the respective optical pulse groups La1 and La2 are spectrally separated by the diffraction grating 61*a*.

In addition to the first optical pulse group La1 and the second optical pulse group La2, a third optical pulse group (third wavelength component group) may exist. For this, for example, in FIG. 3, a dichroic mirror is newly added between the lens 62 and the dichroic mirror 63*a* to guide the third optical pulse group to an optical path different from that of the first optical pulse group La1 and the second optical pulse group La2. In this case, a third spatial light modulator corresponding to the third optical pulse group may be further provided.

Figure 5:
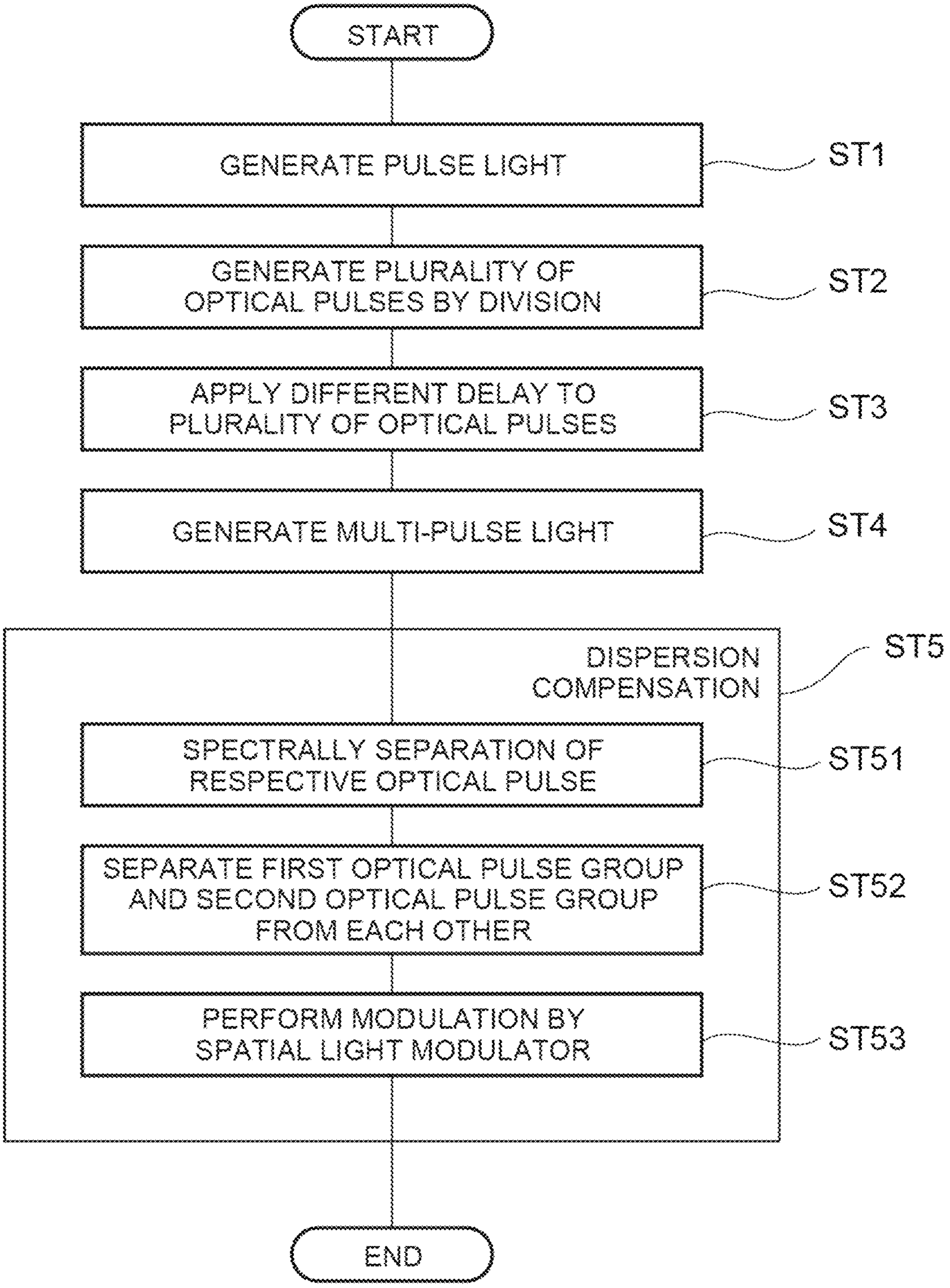
FIG. 5 is a flowchart illustrating a multi-pulse light generation method of the first embodiment.

Description will be given of a multi-pulse light generation method using the above-described multi-pulse light source 1. FIG. 5 is a flowchart illustrating a multi-pulse light generation method of this embodiment. First, pulse light L1 capable of being separated into a plurality of optical pulses La different in a central wavelength is generated by the pulse light source 2 (pulse light generation step ST1). Next, the pulse light L1 is spectrally separated into a plurality of wavelength components by the spectroscopic unit 3, thereby generating a plurality of optical pulses La different in a central wavelength (spectroscopic step ST2). Next, in the delay application unit 4, the plurality of optical pulses La pass through a plurality of optical fibers 41 different in a length. According to this, a delay different for each optical pulse La is applied to the plurality of optical pulses La (delay application step ST3). Next, the plurality of optical pulses La which have passed through the plurality of optical fibers 41 are combined on one optical path in the combining unit 5. As a result, multi-pulse light Lb including the plurality of optical pulses La which are different in a central wavelength and have time intervals is generated (combining step ST4).

Next, in the dispersion compensation unit 6, with respect to the plurality of optical pulses La, a dispersion is compensated for each optical pulse La (dispersion compensation step ST5). In this example, the dispersion compensation step ST5 is performed after the combining step ST4, but the dispersion compensation step ST5 may be performed between the pulse light generation step ST1 and the spectroscopic step ST2.

The dispersion compensation step ST5 includes a spectroscopic step ST51, a separation step ST52, and a modulation step ST53. In the spectroscopic step ST51, the optical pulses La are spectrally separated by the spectroscopic element 61. In the separation step ST52, the first optical pulse group La1 including one or more optical pulses La among the plurality of optical pulses La, and the second optical pulse group La2 including one or more optical pulses La different from the optical pulses La constituting the first optical pulse group La1 are guided to optical paths different from each other by the separation optical element 63. In this example, the separation step ST52 is performed after the spectroscopic step ST51, but the separation step ST52 may be performed first, and then, the spectroscopic step ST51 may be performed.

In the modulation step ST53, in the spatial light modulator 65 including the modulation plane 65*a* on which the first optical pulse group La1 is incident, modulation for compensating a dispersion for each optical pulse La is performed with respect to the first optical pulse group La1. Simultaneously, in the spatial light modulator 66 including the modulation plane 66*a* on which the second optical pulse group La2 is incident, modulation for compensating a dispersion for each optical pulse La is performed with respect to the second optical pulse group La2.

Figure 6:
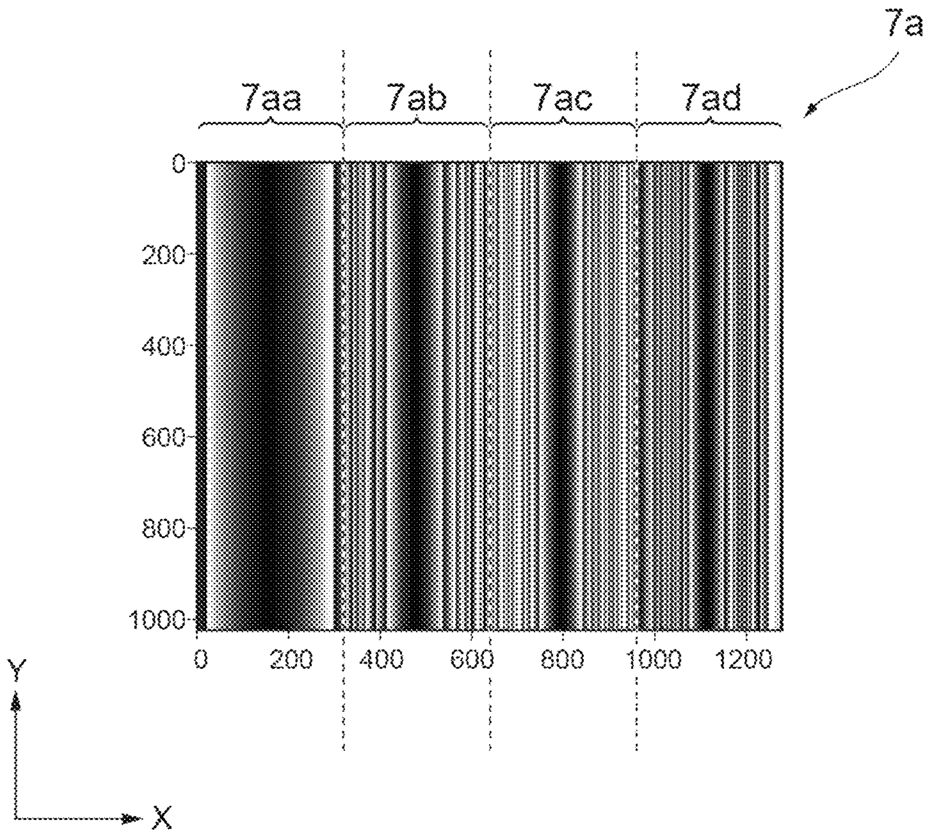
FIG. 6 is a view illustrating a modulation plane of a spatial light modulator according to a comparative example.

An effect of the multi-pulse light source 1 and the multi-pulse light generation method of the above-described embodiment will be described in combination with a comparative example. In FIG. 6, a phase distribution on a modulation plane 7*a* as the comparative example is illustrated by color shading. In the example shown in FIG. 6, four optical pulses La are incident on a single spatial light modulator without being separated into the first optical pulse group La1 and the second optical pulse group La2. Accordingly, in the modulation plane 7*a*, four modulation regions 7*aa*, 7*ab*, 7*ac*, and 7*ad* corresponding to four optical pulses La are aligned on the single modulation plane 7*a* along a spectral direction. Here, wavelength resolution in a spatial light modulator becomes a value obtained by dividing a wavelength band of incident light by the number of pixels of the modulation plane in the spectral direction. In this embodiment, the dispersion compensation is performed by using two spatial light modulator including the first spatial light modulator 65 and the second spatial light modulator 66. In this case, as is clear when comparing FIG. 4(*a*) and FIG. 4(*b*) with FIG. 6, as compared with a case of using a single spatial light modulator, a width of a modulation region corresponding to each optical pulse La in the spectral direction becomes two times, and the number of pixels in the same direction also becomes two times. Accordingly, the wavelength resolution is improved two times.

In this way, in the multi-pulse light source 1 and the multi-pulse light generation method of this embodiment, wavelength resolution for each of the optical pulse La is further improved as compared with a case of using a single spatial light modulator. According to this, the maximum amount of dispersion compensation can be significantly improved. As a result, dispersion of the multi-pulse light Lb different in a central wavelength for each optical pulse La can be more effectively compensated for each optical pulse La.

Figure 7:
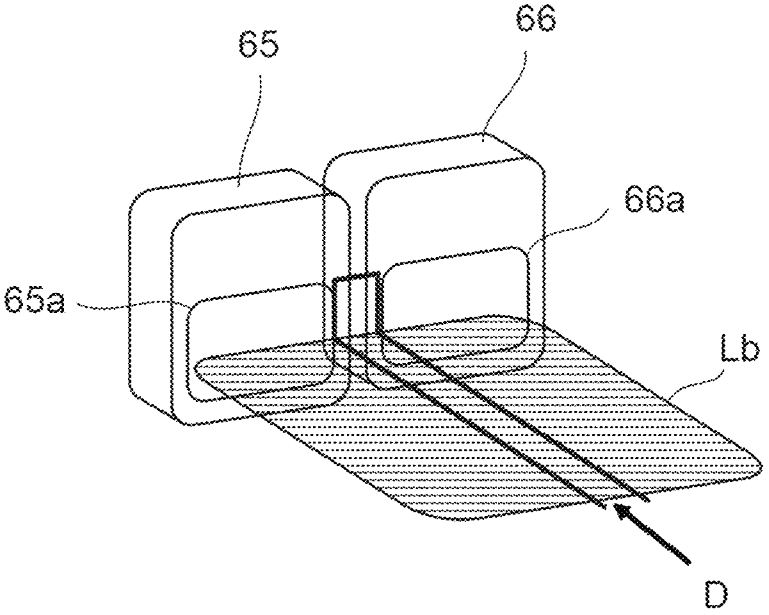
FIG. 7 is a view in which spatial light modulators according to the comparative example are aligned in parallel.

As an additional comparative example, FIG. 7 shows a view in which the first spatial light modulator 65 and the second spatial light modulator 66 are aligned in the spectral direction. In this comparative example, the separation optical element 63 is not provided, and the multi-pulse light Lb is incident on the first spatial light modulator 65 and the second spatial light modulator 66 without being separated into the first optical pulse group La1 and the second optical pulse group La2. In this case, a dead space D occurs between the modulation plane 65*a* of the first spatial light modulator 65 and the modulation plane 66*a* of the second spatial light modulator 66. Light incident on the dead space D is not modulated. Accordingly, in order to modulate all bands of the respective optical pulses La, as illustrated in FIG. 3, the first optical pulse group La1 and the second optical pulse group La2 are guided to optical paths different from each other by the separation optical element 63, and then the first spatial light modulator 65 and the second spatial light modulator 66 may be respectively disposed on the optical paths.

In this embodiment, the spectroscopic element 61 includes the diffraction grating 61*a*. When using the diffraction grating 61*a*, a plurality of optical pulses La, that is, a plurality of wavelength components can be incident on the first spatial light modulator 65 and the second spatial light modulator 66 after being appropriately and spectrally separated. In addition, the spectroscopic element 61 can be simply configured.

In this embodiment, the separation optical element 63 includes the dichroic mirror 63*a*. When using the dichroic mirror 63*a*, since the plurality of optical pulses La (wavelength components) can be reflected or transmitted through in correspondence with a wavelength region, the first optical pulse group La1 and the second optical pulse group La2 can be appropriately separated. In addition, the separation optical element 63 can be configured simply.

In this embodiment, the dispersion compensation unit 6 is placed downstream of the delay application unit 4. According to this, dispersion compensation can be performed directly with respect to each of the plurality of optical pulses La (wavelength components) in which different wavelength dispersions occur due to application of delays different from each other. Accordingly, an effect of the dispersion compensation for individual optical pulses La (wavelength components) can be confirmed efficiently.

In this embodiment, the delay application unit 4 includes the plurality of optical fibers 41 which propagate a plurality of wavelength components respectively and are different in a length. According to this, since a delay can be applied in correspondence with the length of the optical fibers 41, the delay application unit 4 can be simply configured.

Second Embodiment

Figure 8:
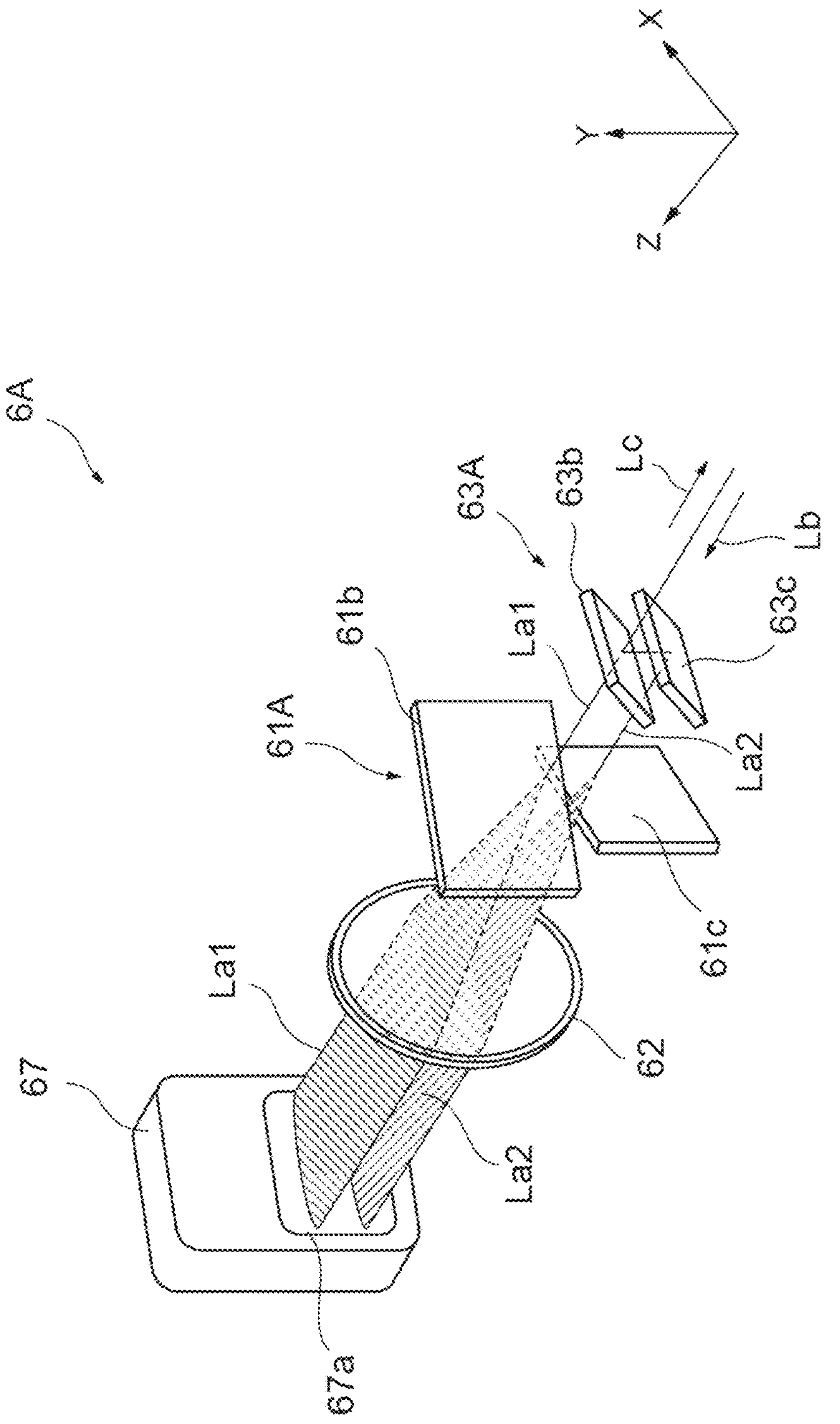
FIG. 8 is a view illustrating a configuration of a dispersion compensation unit according to a second embodiment.

FIG. 8 is a view illustrating a configuration of a dispersion compensation unit 6A according to a second embodiment. In the second embodiment, configurations of the pulse light source 2, the spectroscopic unit 3, the delay application unit 4, and the combining unit 5 are the same as in the first embodiment. The dispersion compensation unit 6A includes a spectroscopic element 61A, a lens 62, a separation optical element 63A, and a spatial light modulator 67. The separation optical element 63A is placed upstream of the spectroscopic element 61A differently from the first embodiment in FIG. 3. In the second embodiment, as an example, the spectroscopic element 61A includes a first diffraction grating 61*b* and a second diffraction grating 61*c*. The first diffraction grating 61*b* and the second diffraction grating 61*c* are aligned along the Y-axis direction. As an example, the separation optical element 63A includes a dichroic mirror 63*b* and a mirror 63*c*. The dichroic mirror 63*b* and the mirror 63*c* are aligned along the Y-axis direction. The first diffraction grating 61*b* is disposed on an optical path between the dichroic mirror 63*b* and the spatial light modulator 67. The second diffraction grating 61*c* is disposed on an optical path between the mirror 63*c* and the spatial light modulator 67.

The multi-pulse light Lb input to the dispersion compensation unit 6A is first incident on the dichroic mirror 63*b*. The dichroic mirror 63*b* allows the first optical pulse group La1 to be transmitted therethrough, and reflects the second optical pulse group La2 in the Y-axis direction toward the mirror 63*c*. Then, the mirror 63*c* reflects the second optical pulse group La2 reflected from the dichroic mirror 63*b* toward the Z-axis direction that is a direction parallel to the optical path of the first optical pulse group La1. As a result, the first optical pulse group La1 and the second optical pulse group La2 are guided to optical paths different from each other.

The first diffraction grating 61*b* spatially and spectrally separates respective optical pulses La included in the first optical pulse group La1. The second diffraction grating 61*c* spatially and spectrally separates respective optical pulses La included in the second optical pulse group La2. The spectral direction of the first diffraction grating 61*b* and the second diffraction grating 61*c* is the X-axis direction. Since the first optical pulse group La1 and the second optical pulse group La2 are aligned along the Y-axis direction, the spectral direction of the optical pulse groups La1 and La2 intersects a direction in which the optical pulse groups La1 and La2 are aligned. The lens 62 is disposed on an optical path between the spectroscopic element 61A and the spatial light modulator 67. The separated first optical pulse group La1 and the second optical pulse group La2 are collimated mainly on the XZ plane by the lens 62, and are incident on a modulation plane 67*a* of the spatial light modulator 67.

Figure 9:
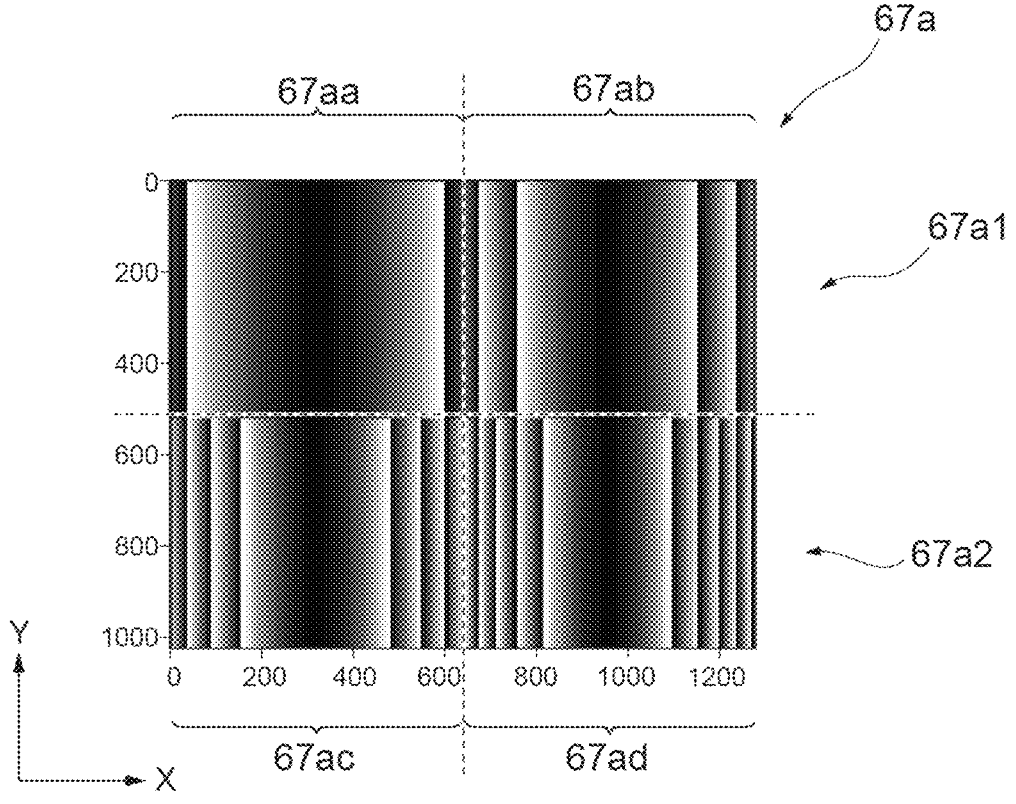
FIG. 9 is a view illustrating a modulation plane of a spatial light modulator according to the second embodiment.

FIG. 9 is a view illustrating an example of the modulation plane 67*a*. As illustrated in FIG. 9, the modulation plane 67*a* extends along the X-axis and the Y-axis. A plurality of pixels are arranged on the modulation plane 67*a* in a two-dimensional shape. The modulation plane 67*a* includes a first modulation region 67*a*1 on which the first optical pulse group La1 is incident and a second modulation region 67*a*2 on which the second optical pulse group La2 is incident. The first modulation region 67*a*1 and the second modulation region 67*a*2 are aligned along the Y-axis direction. That is, the first modulation region 67*a*1 and the second modulation region 67*a*2 are aligned along directions intersecting respective spectral directions of the first optical pulse group La1 and the second optical pulse group La2 when being incident on the first modulation region 67*a*1 and the second modulation region 67*a*2.

In the example illustrated in FIG. 9, two optical pulses La are included in the first optical pulse group La1 and two optical pulse La are included in the second optical pulse group La2. In this case, in the first modulation region 67*a*1, a modulation region 67*aa* and a modulation region 67*ab* are aligned along the X-axis direction and extend in the Y-axis direction. Among the optical pulses La included in the first optical pulse group La1, a corresponding optical pulse La is incident on each of the modulation region 67*aa* and the modulation region 67*ab*. In the second modulation region 67*a*2, a modulation region 67*ac* and a modulation region 67*ad* are aligned in the X-axis direction and extend in the Y-axis direction. In the optical pulses La included in the second optical pulse group La2, a corresponding optical pulse La is incident on each of the modulation region 67*ac* and the modulation region 67*ad*.

In FIG. 9, a phase distribution on the modulation plane 67*a* is shown by color shading. In the same drawing, as the color is darker, a phase value is closer to 2π (rad), and as the color is lighter, the phase value is closer to 0 (rad). In FIG. 9, numbers aligned in the X-axis direction are pixel numbers in the X-axis direction, and numbers aligned in the Y-axis direction are pixel numbers in the Y-axis direction. A phase modulation pattern is displayed in each of the modulation regions 67*aa*, 67*ab*, 67*ac*, and 67*ad*. The phase modulation pattern varies along the X-axis direction and is constant in the Y-axis direction. In the phase modulation pattern, as the amount of phase modulation is greater, a larger dispersion can be compensated. In the example shown in FIG. 9, the amount of phase modulation of the phase modulation pattern is largest in the modulation region 67*ad*, next largest in the modulation region 67*ac*, next largest in the modulation region 67*ab*, and smallest in the modulation region 67*aa*. Accordingly, the amount of dispersion compensation is largest in the modulation region 67*ad*, next largest in the modulation region 67*ac*, next largest in the modulation region 67*ab*, and smallest in the modulation region 67*aa*.

Description will be made with reference to FIG. 8 again. The first optical pulse group La1 and the second optical pulse group La2 which are modulated and reflected by the spatial light modulator 67 are focused to one point on the diffraction gratings 61*b* and 61*c* by the lens 62. The diffraction grating 61*b* functions as a combining optical system, and combines one or more optical pulses La constituting the first optical pulse group La1. The diffraction grating 61*c* also functions as a combining optical system, and combines one or more optical pulses La constituting the second optical pulse group La2. The first optical pulse group La1 and the second optical pulse group La2 are guided to one common optical path again by the dichroic mirror 63*b*, and become multi-pulse light Lc after dispersion compensation.

Figure 10:
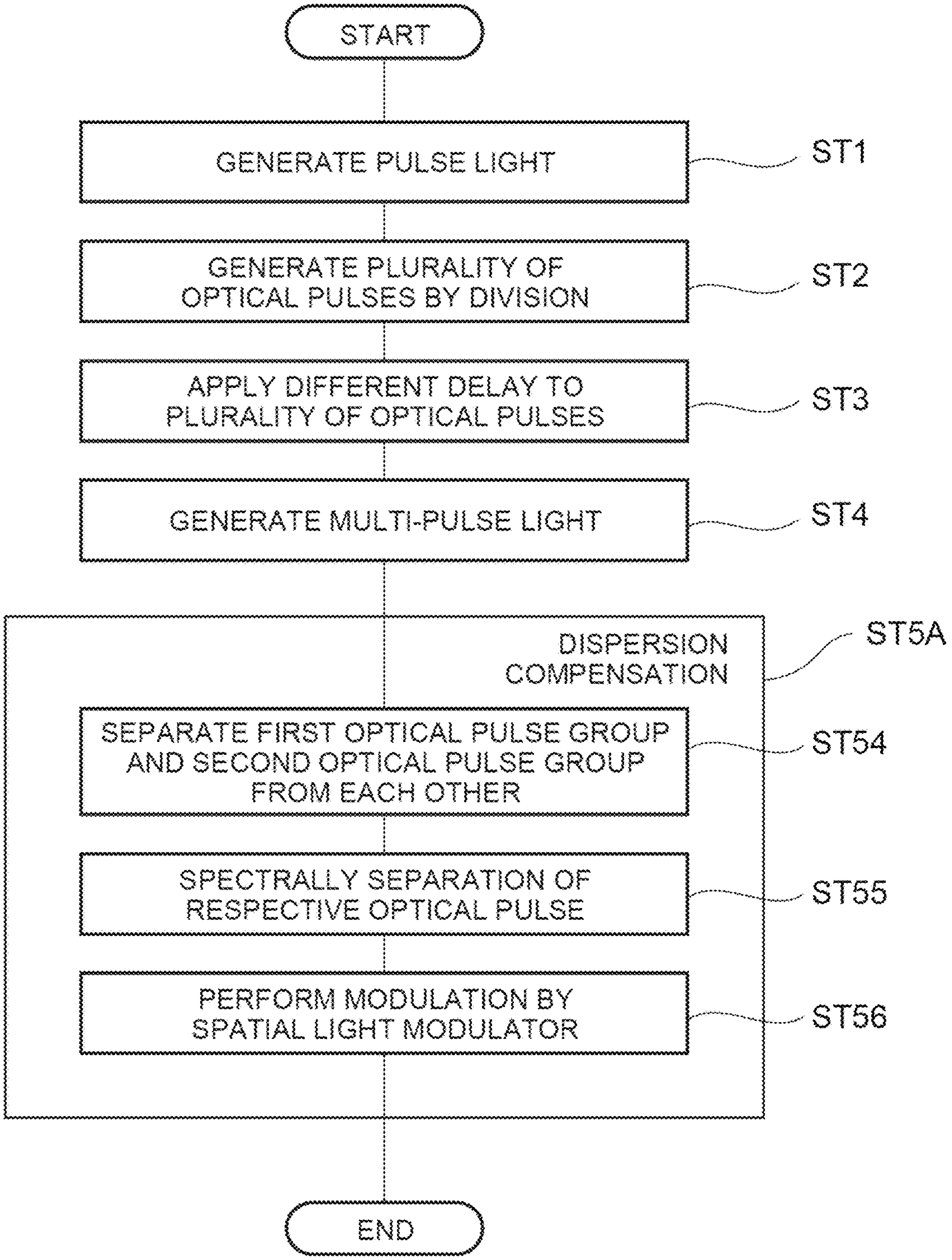
FIG. 10 is a flowchart illustrating a multi-pulse light generation method of the second embodiment.

Description will be given of a multi-pulse light generation method using the dispersion compensation unit 6A of this embodiment. FIG. 10 is a flowchart illustrating the multi-pulse light generation method of this embodiment. A pulse light generation step ST1, a spectroscopic step ST2, a delay application step ST3, and a combining step ST4 are the same as in the first embodiment, and thus description thereof will be omitted.

After the combining step ST4, in the dispersion compensation unit 6A, with respect to the plurality of optical pulses La, a dispersion is compensated for each optical pulse La (dispersion compensation step ST5A). In this example, the dispersion compensation step ST5A is performed after the combining step ST4, but the dispersion compensation step ST5A may be performed between the pulse light generation step ST1 and the spectroscopic step ST2.

The dispersion compensation step ST5A includes a separation step ST54, a spectroscopic step ST55, and a modulation step ST56. In the separation step ST54, the first optical pulse group La1 including one or more optical pulses La among the plurality of optical pulses La and the second optical pulse group La2 including one or more optical pulses La different from the optical pulses La constituting the first optical pulse group La1 are guided to optical paths different from each other by the separation optical element 63A. In the spectroscopic step ST55, the respective optical pulses La are spectrally separated by the spectroscopic element 61A. In this example, the spectroscopic step ST55 is performed after the separation step ST54, but the spectroscopic step ST55 may be performed first, and then the separation step ST54 may be performed.

In the modulation step ST56, in the spatial light modulator 67 having the modulation plane 67*a* including the first modulation region 67*a*1 on which the first optical pulse group La1 is incident and the second modulation region 67*a*2 on which the second optical pulse group La2 is incident, with respect to the first optical pulse group La1 and the second optical pulse group La2, modulation for compensating a dispersion for each optical pulse La is performed. As described above, the first modulation region 67*a*1 and the second modulation region 67*a*2 are aligned along a direction intersecting respective spectral directions of the first optical pulse group La1 and the second optical pulse group La2 when being incident on the first modulation region 67*a*1 and the second modulation region 67*a*2.

An effect obtained by the above-described second embodiment will be described. Here, as in the first embodiment, the resolution for each of the optical pulses La on the modulation plane 67*a* of this embodiment is compared with the resolution for each of the optical pulses La on the modulation plane 7*a* described in FIG. 6. As described above, in the example illustrated in FIG. 6, four optical pulses La are incident on a single spatial light modulator without being separated into the first optical pulse group La1 and the second optical pulse group La2. Accordingly, in the modulation plane 7*a*, four modulation regions 7*aa*, 7*ab*, 7*ac*, and 7*ad* corresponding to the plurality of optical pulses La are aligned along the spectral direction in the single modulation plane 7*a*. In contrast, in the dispersion compensation unit 6A according to the second embodiment, after the multi-pulse light Lb is separated into the first optical pulse group La1 and the second optical pulse group La2, the first optical pulse group La1 is incident on the first modulation region 67*a*1 of the spatial light modulator 67, and the second optical pulse group La2 is incident on the second modulation region 67*a*2 of the spatial light modulator 67. The first modulation region 67*a*1 and the second modulation region 67*a*2 are aligned along a direction intersecting the spectral directions of the first optical pulse group La1 and the second optical pulse group La2 when being incident on the first modulation region 67*a*1 and the second modulation region 67*a*2. Accordingly, as is clear when comparing FIG. 9 and FIG. 6 with each other, a width of a modulation region corresponding to each optical pulse La in the spectral direction becomes two times, and the number of pixels in the same direction also becomes two times. As described above, wavelength resolution in a spatial light modulator becomes a value obtained by dividing a wavelength band of incident light by the number of pixels of the modulation plane in the spectral direction. Therefore, the wavelength resolution is improved two times.

As described above, according to the multi-pulse light source and the multi-pulse light generation method of the second embodiment, since wavelength resolution for each of the optical pulse La in the spatial light modulator is improved, the maximum amount of dispersion compensation can be significantly improved. As a result, dispersion of the multi-pulse light Lb different in a central wavelength for each optical pulse La can be more effectively compensated for each optical pulse La.

Modification Example

Figure 11:
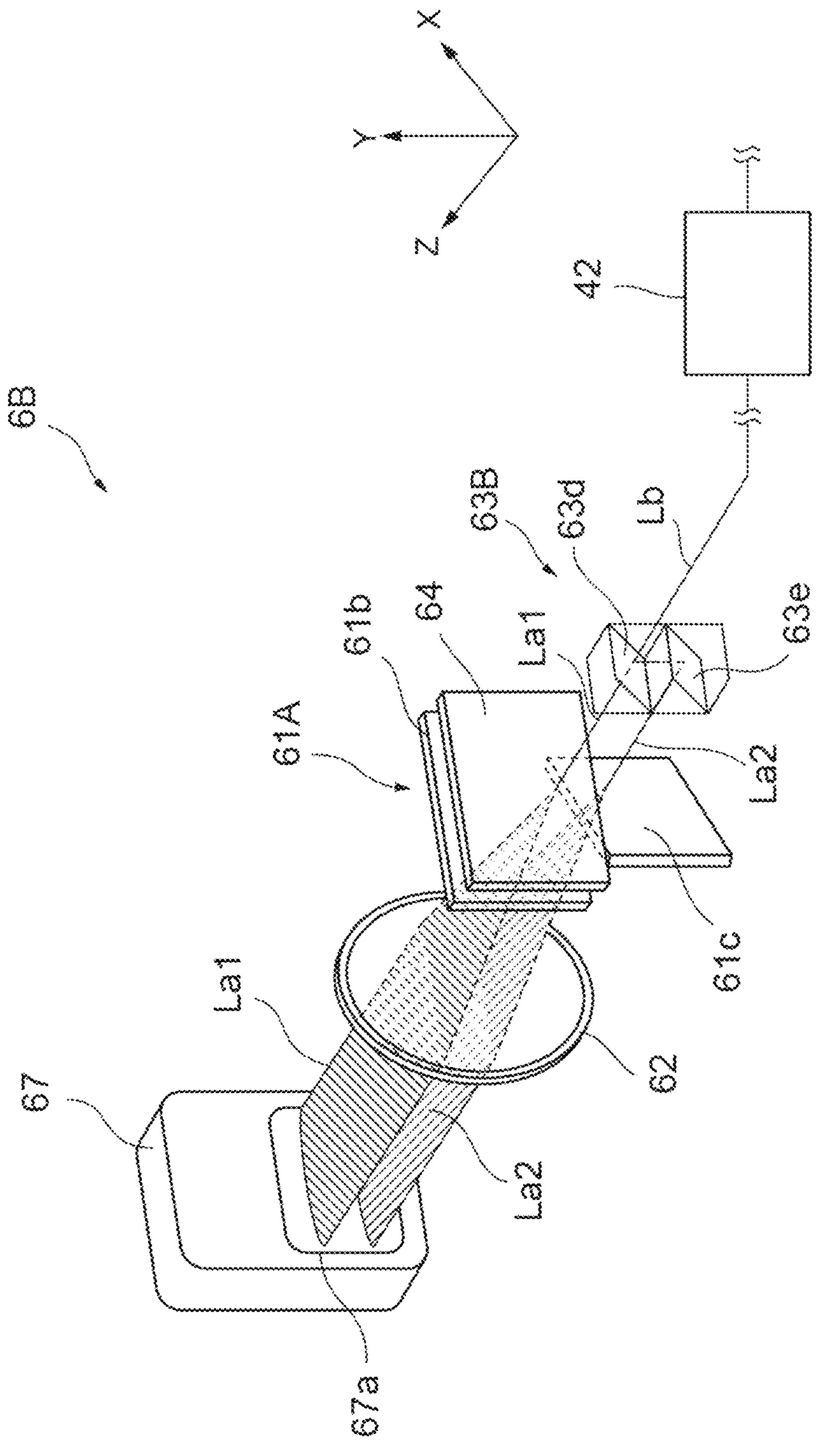
FIG. 11 is a view illustrating a configuration of a dispersion compensation unit according to Modification Example of the second embodiment.

FIG. 11 illustrates a configuration of a dispersion compensation unit 6B according to Modification Example of the second embodiment. The dispersion compensation unit 6B of Modification Example includes a separation optical element 63B instead of the separation optical element 63A (the dichroic mirror 63*b* and the mirror 63*c*) of the second embodiment. The separation optical element 63B includes a polarization beam splitter 63*d* and a mirror 63*e*. The separation optical element 63B may include a birefringent crystal instead of the polarization beam splitter 63*d*. The dispersion compensation unit 6B further includes a wavelength plate 64. The wavelength plate 64 is disposed on the optical path of the first optical pulse group La1 between the separation optical element 63B and the spectroscopic element 61A.

A multi-pulse light source of this Modification Example further includes a polarization control unit 42. Configurations other than the dispersion compensation unit 6B and the polarization control unit 42 of the multi-pulse light source of this Modification Example are the same as in the first embodiment. The polarization control unit 42 makes a polarization direction of one or more optical pulses La included in the first optical pulse group La1 and a polarization direction of one or more optical pulses La included in the second optical pulse group La2 before being incident on the separation optical element 63B be orthogonal to each other. For example, the polarization control unit 42 includes the same number of polarization maintaining fibers as a plurality of optical pulses La. Between a light input end to a light output end of the plurality of the polarization maintaining fibers, a polarization plane of the polarization maintaining fibers which propagate the optical pulses La subsequently guided as the first optical pulse group La1 is rotated by 90° in a clockwise rotating direction or a counterclockwise rotating direction with respect to a polarization plane of polarization maintaining fibers which propagate optical pulses La subsequently guided as the second optical pulse group La2. By transmitting each of the respective optical pulses La into the inside of a corresponding polarization maintaining fiber, a polarization direction of each optical pulse La subsequently guided as the first optical pulse group La1 and a polarization direction of each optical pulse La subsequently guided as the second optical pulse group La2 can be controlled to be an orthogonal state. The plurality of optical fibers 41 shown in FIG. 2 may be the plurality of polarization maintaining fibers. In this case, the delay application unit 4 also serves as the polarization control unit 42. In addition, lengths of the plurality of polarization maintaining fibers are different from each other.

The multi-pulse light Lb including the plurality of optical pulses La of which polarization is controlled by the polarization control unit 42 is incident on the polarization beam splitter 63*d* (or the birefringent crystal). The polarization beam splitter 63*d* (or the birefringent crystal) allows the first optical pulse group La1 to be transmitted therethrough and reflects the second optical pulse group La2 toward the mirror 63*e* in the Y-axis direction. Then, the mirror 63*e* reflects the second optical pulse group La2 toward the Z-axis direction that is a direction parallel to the optical path of the first optical pulse group La1. As a result, the first optical pulse group La1 and the second optical pulse group La2 are guided to optical paths different from each other.

The first optical pulse group La1 is incident on the wavelength plate 64. The polarization direction of the first optical pulse group La1 is rotated by 90° in a clockwise rotating direction or a counterclockwise rotating direction by the wavelength plate 64. According to this, the polarization direction of the first optical pulse group La1 matches the polarization direction of the second optical pulse group La2.

Even in the dispersion compensation unit 6 according to the first embodiment illustrated in FIG. 3, as in this Modification Example, the polarization beam splitter 63*d* (or the birefringent crystal) and the mirror 63*e* may be used instead of the dichroic mirror 63*a*. In this case, the multi-pulse light source 1 may further include the polarization control unit 42. Before the plurality of optical pulses La are incident on the polarization beam splitter 63*d* (or the birefringent crystal), the polarization control unit 42 makes a polarization direction of the optical pulses La included in the first optical pulse group La1 and a polarization direction of the optical pulses La included in the second optical pulse group La2 be orthogonal to each other. The polarization beam splitter 63*d* (or the birefringent crystal) guides the first optical pulse group La1 and the second optical pulse group La2 to optical paths different from each other on the basis of the polarization directions.

In a case of using the polarization beam splitter 63*d* (or the birefringent crystal) and the mirror 63*e* instead of the dichroic mirror 63*a*, the dispersion compensation unit 6 may further include the wavelength plate 64 between the separation optical element 63 and the first spatial light modulator 65.

According to the multi-pulse light source of this Modification Example, after performing control on the polarization direction by the polarization control unit 42, it is possible to guide the first optical pulse group La1 and the second optical pulse group La2 to optical paths different from each other in correspondence with the polarization directions by using the polarization beam splitter 63*d* (or the birefringent crystal) and the mirror 63*e*. In addition, by causing the first optical pulse group La1 to be transmitted through the wavelength plate 64, the first optical pulse group La1 and the second optical pulse group La2 can be incident on the spatial light modulator 67 after the polarization direction of the first optical pulse group La1 and the polarization direction of the second optical pulse group La2 are made to match each other.

As described above, the delay application unit 4 may also serve as the polarization control unit 42. According to this, the number of necessary constituent elements is reduced, and the multi-pulse light source can be simplified.

As described above, the polarization control unit 42 includes the plurality of polarization maintaining fibers which propagate the plurality of optical pulses La respectively, lengths of the plurality of polarization maintaining fibers are different from each other, and between the light input end and the light output end of the plurality of polarization maintaining fibers, the polarization plane of the plurality of polarization maintaining fibers which propagate the optical pulses La included in the first optical pulse group La1 is rotated by 90° in a clockwise rotating direction or an anticlockwise rotating direction with respect to the polarization plane of the polarization maintaining fibers which propagate the optical pulses La included in the second optical pulse group La2. In this case, it is possible to appropriately adjust the polarization direction of the one or more optical pulses La included in the first optical pulse group La1 and the polarization direction of the one or more optical pulses La included in the second optical pulse group La2 while applying a delay in correspondence with the length of the polarization maintaining fibers.

EXAMPLES

First, a required amount of dispersion compensation is estimated. When a refractive index of the optical fibers 41 is set to 1.5, a time interval of the plurality of optical pulses La is set to dt, and an increment value of the length of the plurality of optical fibers 41 is set to L, the following mathematical formula is established. Provided that, C is a speed of light.

$$dt=n\cdot L/C$$

For example, the length of the plurality of optical fibers 41 may be increased in 0.6 m increment in order to set the time interval dt of a plurality of optical pulses La included in the multi-pulse light Lb to 3 ns, and the length of the plurality of optical fibers 41 may be increased in 1 m increment in order to set the time interval dt to 5 ns. The time interval such as 3 ns to 5 ns corresponds to a fluorescence lifespan and is a value suitable for a case where the multi-pulse light Lb is used for fluorescence observation. When the number of the optical pulses La is set to four, and the length of the shortest optical fiber 41 is set to 0.5 m, the length of the longest optical fiber 41 becomes 3.5 m. When the length is converted into dispersion, the length becomes 70000 $fs^2$ (secondary dispersion $\beta_2$ of the optical fibers 41 is assumed as 20 $ps^2$/km). It is desired to compensate the dispersion as much as possible.

Figure 12:
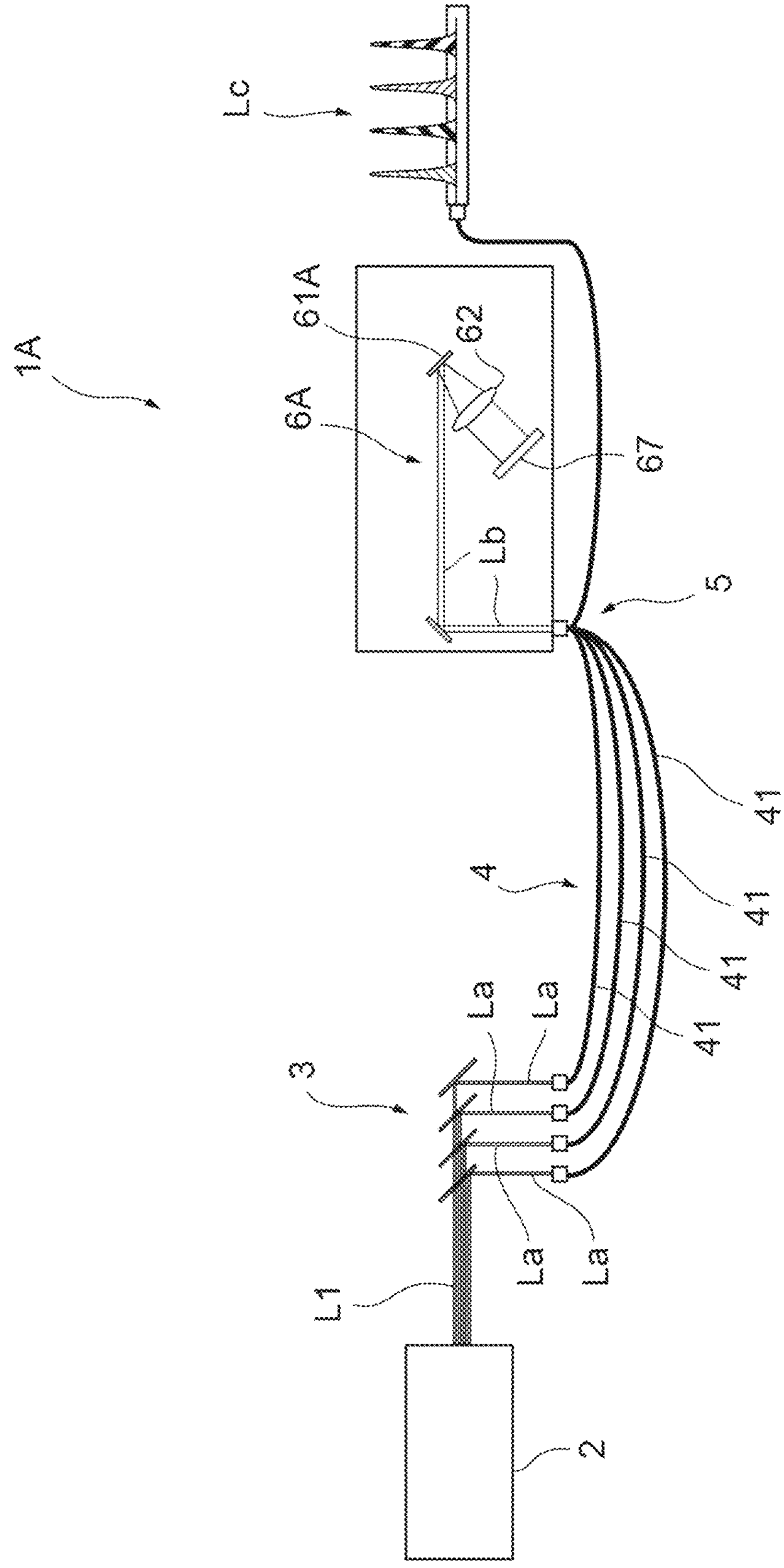
FIG. 12 is a view illustrating a configuration of a multi-pulse light source according to Examples.

FIG. 12 illustrates a configuration of a multi-pulse light source 1A according to Examples. The pulse light source 2 is a laser light source and emits near-infrared pulse light L1 in a femtosecond region. The pulse light L1 has a certain degree of wavelength band spread capable of being separated into four optical pulses La of which central wavelengths are λ1: 938 nm, λ2: 1013 nm, λ3: 1088 nm, and λ4: 1163 nm. Next, the spectroscopic unit 3 spectrally separates the pulse light L1 into four optical pulses La. The spectroscopic unit 3 is a dichroic mirror array and causes the separated four optical pulses La to be incident on the delay application unit 4.

Figure 13:
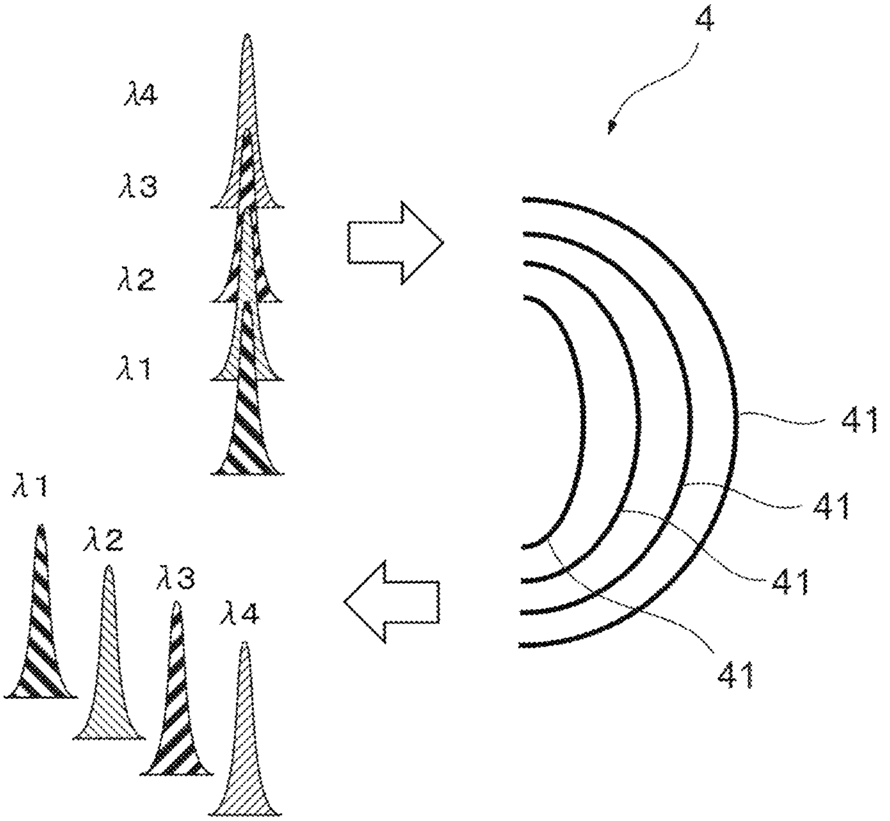
FIG. 13 is a view describing a delay application unit according to Examples.

The delay application unit 4 includes four optical fibers 41 different in a length. As illustrated in FIG. 13, in this Examples, the optical pulse La with the wavelength of λ1 is incident on the shortest optical fiber 41, and the lengths of the optical fibers 41 on which optical pulses La are incident in the order of wavelengths λ2, λ3, and λ4 are gradually increased. The length of the shortest optical fiber 41 is 0.5 m, and the lengths are increased in 1 m increment. That is, the length of the longest optical fiber 41 is 3.5 m.

Description will be made with reference to FIG. 12 again. The respective optical pulses La transmitted through the delay application unit 4 are combined in the combining unit 5 to be multi-pulse light Lb. Then, the dispersion compensation is performed in the dispersion compensation unit 6A according to the second embodiment, and the multi-pulse light Lc after dispersion compensation is generated.

Figure 14:
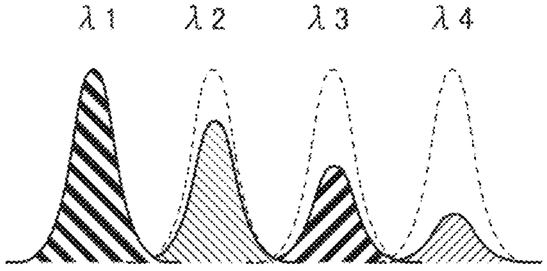
FIGS. 14 (*a*) and (*b*) of FIG. 14 are views describing a variation of a peak intensity of each wavelength component according to Examples and the comparative example.
Figure 14:
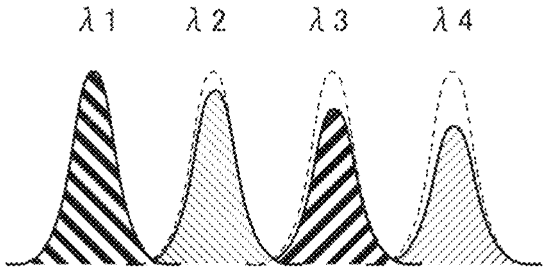

FIG. 14 illustrates a time intensity waveform (broken line) of each of the optical pulses La before being incident on the delay application unit 4, and a time intensity waveform (solid line) of each of the optical pulses La after dispersion compensation. FIG. 14(*a*) is a result according to a comparative example. In the comparative example, a spatial light modulator 7 (refer to FIG. 6) in which a plurality of modulation regions respectively corresponding to a plurality of optical pulses La are aligned only in the spectral direction of the optical pulses La when being incident on a modulation plane was used. In addition, the separation optical element 63 was not used, and the multi-pulse light Lb was incident on the modulation plane 7*a* of the spatial light modulator 7 without being separated into the first optical pulse group La1 and the second optical pulse group La2. On the other hand, FIG. 14(*b*) is a result when using the dispersion compensation unit 6A according to the second embodiment. In both Examples and the comparative example, the number of pixels in the spectral direction of the spatial light modulators 67 and 7 was set to 1280, and optical resolution was set to 23.7 m. A grating density of the diffraction gratings 61*b* and 61*c* in Examples was set to 1100 lines/mm, and a grating density in a diffraction grating of the comparative example was set to 600 lines/mm.

In a case where a peak intensity of each of the optical pulses La before being incident on the delay application unit 4 is set to 100%, in FIG. 14(*a*), a peak intensity of each of the optical pulses La after dispersion compensation was 97% at the wavelength λ1, 80% at the wavelength λ2, 57% at the wavelength λ3, and 37% at the wavelength λ4. On the other hand, in FIG. 14 (*b*), the peak intensity was 99% at the wavelength λ1, 94% at the wavelength λ2, 86% at the wavelength λ3, and 75% at the wavelength λ4. That is, it can be understood that attenuation of peak intensity can be significantly suppressed in Examples as compared with the comparative example. This is due to a difference in the wavelength resolution between the respective modulation regions in the spatial light modulator. In the comparative example, the number of pixels per one modulation region in the spectral direction is 1280/4=320, and the wavelength resolution of each of the modulation regions is 0.234 nm obtained by dividing a wavelength band of 75 nm of one optical pulse La by the number of pixels 320. In contrast, in Examples, the number of pixels per one modulation region in the spectral direction is 1280/2=640, and the wavelength resolution of each of the modulation regions is 0.117 nm obtained by dividing a wavelength band of 75 nm of one optical pulse La by the number of pixels 640. In this manner, the wavelength resolution of Examples becomes two times the wavelength resolution of the comparative example. In this Examples, the configuration of the second embodiment is employed, but the wavelength resolution becomes the same value even in the first embodiment, and thus the first embodiment can obtain the same dispersion compensation effect as in this Examples.

Application Example

The multi-pulse light sources according to the first embodiment and the second embodiment are applicable to a multi-modal microscope. In recent, a nonlinear optical microscope based on a phenomenon such as multiphoton excitation and higher harmonic generation has attracted attention as an alternative to fluorescence observation in the related art. A microscope having a function capable of identifying a plurality of different targets by identifying optical response based on a plurality of observation modalities such as the multiphoton excitation and the higher harmonic generation is called a multimodal microscope. In the multimodal observation, since pulse light with a wide range of wavelength corresponding to a plurality of different observation modalities is used, the multi-pulse light source is useful. However, in a case where time waveforms of respective optical pulses La of the multi-pulse light Lb are different from each other in accordance with wavelength dispersion, a peak intensity of the optical pulses becomes different for each target, and thus stable measurement cannot be performed. Here, when using the multi-pulse light source according to the first embodiment or the second embodiment, since dispersion of multi-pulse light in which a central wavelength is different for each pulse can be more effectively compensated for each pulse, the multimodal observation can be stably performed.

REFERENCE SIGNS LIST

1: multi-pulse light source, 2: pulse light source, 4: delay application unit, 41: optical fiber, 42: polarization control unit, 6: dispersion compensation unit, 61: spectroscopic element, **61*a*: diffraction grating, 63: separation optical element, 63*a*: dichroic mirror, 63*b*: dichroic mirror, 63*c*: mirror, 63*d*: polarization beam splitter, 64: wavelength plate, 65: first spatial light modulator, 66: second spatial light modulator, 67: spatial light modulator, 67*a*1: first modulation region, 67*a*2: second modulation region, L1: pulse light, La1: first wavelength component group, La2**: second wavelength component group.

The invention claimed is:

1. A multi-pulse light source, comprising:

a pulse light source configured to generate pulse light capable of being separated into a plurality of wavelength components different in a central wavelength;

a delay application unit configured to apply a different delay for each wavelength component with respect to the plurality of wavelength components; and a dispersion compensation unit configured to compensate dispersion for each wavelength component with respect to the plurality of wavelength components, wherein the dispersion compensation unit includes, a spectroscopic element configured to spectrally separate the plurality of wavelength components into respective wavelength components, a separation optical element provided upstream or downstream of the spectroscopic element and configured to guide a first wavelength component group including one or more wavelength components among the plurality of wavelength components, and a second wavelength component group including one or more wavelength components different from the one or more wavelength components included in the first wavelength component group among the plurality of wavelength components to optical paths different from each other, a first spatial light modulator including a first modulation region on which the first wavelength component group is incident, the first modulation region being configured to modulate for compensating dispersion for each wavelength component with respect to the first wavelength component group, and a second spatial light modulator including a second modulation region on which the second wavelength component group is incident, the second modulation region being configured to modulate for compensating dispersion for each wavelength component with respect to the second wavelength component group.

2. A multi-pulse light source, comprising:

a pulse light source configured to generate pulse light capable of being separated into a plurality of wavelength components different in a central wavelength;

a delay application unit configured to apply a different delay for each wavelength component with respect to the plurality of wavelength components; and a dispersion compensation unit configured to compensate dispersion for each wavelength component with respect to the plurality of wavelength components, wherein the dispersion compensation unit includes, a spectroscopic element configured to spectrally separate the plurality of wavelength components into respective wavelength components, a separation optical element provided upstream or downstream of the spectroscopic element and configured to guide a first wavelength component group including one or more wavelength components among the plurality of wavelength components, and a second wavelength component group including one or more wavelength components different from the one or more wavelength components included in the first wavelength component group among the plurality of wavelength components to optical paths different from each other, and a spatial light modulator including a first modulation region on which the first wavelength component group is incident and configured to modulate for compensating dispersion for each wavelength component with respect to the first wavelength component group, and a second modulation region on which the second wavelength component group is incident and configured to modulate for compensating dispersion for each wavelength component with respect to the second wavelength component group, and the first modulation region and the second modulation region are aligned along a direction intersecting spectral directions of the first wavelength component group and the second wavelength component group when being incident on the first modulation region and the second modulation region, respectively.

3. The multi-pulse light source according to claim 1, wherein the spectroscopic element includes a diffraction grating.

4. The multi-pulse light source according to claim 1, wherein the separation optical element includes a dichroic mirror.

5. The multi-pulse light source according to claim 1, further comprising:

a polarization control unit configured to make a polarization direction of the one or more wavelength components included in the first wavelength component group before being incident on the separation optical element and a polarization direction of the one or more wavelength components included in the second wavelength component group before being incident on the separation optical element be orthogonal to each other; and a wavelength plate provided on an optical path between the separation optical element and the first modulation region and configured to rotate the polarization direction of the first wavelength component group by 90°, wherein the separation optical element includes a polarization beam splitter or a birefringent crystal.

6. The multi-pulse light source according to claim 5, wherein the delay application unit also serves as the polarization control unit.

7. The multi-pulse light source according to claim 6, wherein the delay application unit includes a plurality of polarization maintaining fibers which propagate the plurality of wavelength components respectively, lengths of the plurality of polarization maintaining fibers are different from each other, and a polarization plane of the polarization maintaining fibers which propagate the wavelength components included in the first wavelength component group is rotated by 90° with respect to a polarization plane of the polarization maintaining fibers which propagate the wavelength components included in the second wavelength component group between a light input end and a light output end of the polarization maintaining fibers.

8. The multi-pulse light source according to claim 1, wherein the delay application unit includes a plurality of optical fibers which propagate the plurality of wavelength components respectively and have lengths different from each other.

9. The multi-pulse light source according to claim 1, wherein the dispersion compensation unit is placed downstream of the delay application unit.

10. A multi-pulse light generation method, comprising:

a pulse light generation step of generating pulse light capable of being separated into a plurality of wavelength components different in a central wavelength;

a delay application step of applying a different delay for each wavelength component with respect to the plurality of wavelength components; and a dispersion compensation step of compensating dispersion for each wavelength component with respect to the plurality of wavelength components before or after the delay application step, wherein the dispersion compensation step includes, a spectroscopic step of spectrally separating the plurality of wavelength components into respective wavelength components, a separation step of guiding a first wavelength component group including one or more wavelength components among the plurality of wavelength components, and a second wavelength component group including one or more wavelength components different from the one or more wavelength components included in the first wavelength component group among the plurality of wavelength components to optical paths different from each other before or after the spectroscopic step, and a modulation step of performing modulation for compensating dispersion for each wavelength component with respect to the first wavelength component group in a first spatial light modulator including a first modulation region on which the first wavelength component group is incident, and of performing modulation for compensating dispersion for each wavelength component with respect to the second wavelength component group in a second spatial light modulator including a second modulation region on which the second wavelength component group is incident.

11. A multi-pulse light generation method, comprising:

a pulse light generation step of generating pulse light capable of being separated into a plurality of wavelength components different in central wavelength;

a delay application step of applying a different delay for each wavelength component with respect to the plurality of wavelength components; and a dispersion compensation step of compensating dispersion for each wavelength component with respect to the plurality of wavelength components before or after the delay application step, wherein the dispersion compensation step includes, a spectroscopic step of spectrally separating the plurality of wavelength components into respective wavelength components, a separation step of guiding a first wavelength component group including one or more wavelength components among the plurality of wavelength components, and a second wavelength component group including one or more wavelength components different from the one or more wavelength components included in the first wavelength component group among the plurality of wavelength components to optical paths different from each other before or after the spectroscopic step, and a modulation step of performing modulation for compensating dispersion for each wavelength component with respect to the first wavelength component group and the second wavelength component group in a spatial light modulator that includes a first modulation region on which the first wavelength component group is incident and a second modulation region on which the second wavelength component group is incident, and in which the first modulation region and the second modulation region are aligned along a direction intersecting spectral directions of the first wavelength component group and the second wavelength component group when being incident on the first modulation region and the second modulation region.

* * * * *